May 25, 1965 J. C. ENGEMAN ETAL 3,185,773

SWITCHING SYSTEM CHANNEL SELECTION

Filed May 21, 1962 20 Sheets-Sheet 1

INVENTORS J. C. ENGEMAN
L. FRING, JR.
G. J. HARTMANN

BY [signature]

ATTORNEY

INVENTORS J. C. ENGEMAN
L. FRING, JR.
G. J. HARTMANN

BY *[signature]*

ATTORNEY

SWITCHING SYSTEM CHANNEL SELECTION

Filed May 21, 1962

INVENTORS J. C. ENGEMAN
L. FRING, JR.
G. J. HARTMANN
BY [signature]
ATTORNEY

INVENTORS J. C. ENGEMAN
L. FRING, JR.
G. J. HARTMANN

BY [signature]

ATTORNEY

INVENTORS J. C. ENGEMAN
L. FRING, JR.
G. J. HARTMANN
BY [signature]
ATTORNEY

SWITCHING SYSTEM CHANNEL SELECTION

Filed May 21, 1962 20 Sheets-Sheet 6

INVENTORS J. C. ENGEMAN
L. FRING, JR.
G. J. HARTMANN
BY [signature]
ATTORNEY

INVENTORS J. C. ENGEMAN
L. FRING, JR.
G. J. HARTMANN
BY [signature]
ATTORNEY

SWITCHING SYSTEM CHANNEL SELECTION

Filed May 21, 1962 20 Sheets-Sheet 8

INVENTORS J. C. ENGEMAN
L. FRING, JR.
G. J. HARTMANN
BY S. L. Turner
ATTORNEY

INVENTORS J. C. ENGEMAN
L. FRING, JR.
G. J. HARTMANN
BY
ATTORNEY

INVENTORS J. C. ENGEMAN
L. FRING, JR.
G. J. HARTMANN
BY [signature]
ATTORNEY

INVENTORS J. C. ENGEMAN
L. FRING, JR.
G. J. HARTMANN
BY [signature]
ATTORNEY

SWITCHING SYSTEM CHANNEL SELECTION

Filed May 21, 1962 20 Sheets-Sheet 12

INVENTORS J. C. ENGEMAN
L. FRING, JR.
G. J. HARTMANN
BY [signature]
ATTORNEY

INVENTORS J. C. ENGEMAN
L. FRING, JR.
G. J. HARTMANN
BY [signature]
ATTORNEY

SWITCHING SYSTEM CHANNEL SELECTION

Filed May 21, 1962 20 Sheets-Sheet 14

INVENTORS J. C. ENGEMAN
L. FRING, JR.
G. J. HARTMANN
BY [signature]
ATTORNEY

SWITCHING SYSTEM CHANNEL SELECTION

Filed May 21, 1962 20 Sheets-Sheet 15

INVENTORS J. C. ENGEMAN
L. FRING, JR.
G. J. HARTMANN

BY [signature]

ATTORNEY

SWITCHING SYSTEM CHANNEL SELECTION

INVENTORS J. C. ENGEMAN
L. FRING, JR.
G. J. HARTMANN
BY
ATTORNEY

INVENTORS J. C. ENGEMAN
L. FRING, JR.
G. J. HARTMANN
BY [signature]
ATTORNEY

SWITCHING SYSTEM CHANNEL SELECTION

Filed May 21, 1962 20 Sheets-Sheet 18

INVENTORS J. C. ENGEMAN
L. FRING, JR.
G. J. HARTMANN
BY [signature]
ATTORNEY

INVENTORS J. C. ENGEMAN
L. FRING, JR.
G. J. HARTMANN

BY [signature]

ATTORNEY

SWITCHING SYSTEM CHANNEL SELECTION

Filed May 21, 1962 20 Sheets-Sheet 20

INVENTORS J. C. ENGEMAN
L. FRING, JR.
G. J. HARTMANN
BY [signature]
ATTORNEY 3,185,773
Patented May 25, 1965

3,185,773

SWITCHING SYSTEM CHANNEL SELECTION

John C. Engeman, North Babylon, Leo Fring, Jr., Seaford, and George J. Hartmann, Lindenhurst, N.Y., assignors to American Telephone and Telegraph Company, New York, N.Y., a corporation of New York Filed May 21, 1962, Ser. No. 196,289
18 Claims. (Cl. 179—22)

This invention relates to switching systems and particularly to improvements for increasing the flexibility of such systems.

More specifically, the invention relates to improvements in switching systems for reducing the probability of blocking.

In a particular aspect, the invention is concerned with telephone switching systems and improved arrangements for channel selection.

In a still more particular aspect, this invention relates to telephone system arrangements for making normally unavailable channels, available to interconnect a desired incoming and outgoing line.

Switching systems, in general, include a plurality of terminals and a network of channels for interconnecting any of the terminals in the system. In telephone switching systems these terminals may serve subscriber telephone lines, trunks, data processing machines and many other types of equipment. The problem of internal blocking, i.e., when a channel is not available to interconnect the desired terminals, has been of some concern in the design of such systems since it directly affects quality of the service rendered to the subscriber.

In telephone switching systems it has been observed that different subscribers have different calling characteristics and that the amount of traffic being handled by the switching system is not constant over a given period of time. For instance, in some metropolitan areas where a telephone switching system serves both business establishments and residential homes, it has been noted that the business subscribers use their lines more frequently during certain hours of the business day, while residential subscribers use their lines more frequently during the early morning or evening hours. This results in a few, so called, "peak busy-hours" during which internal blocking most frequently occurs. During the remaining nonbusy hours, much of the switching equipment is not being used, and blocking is minimized. Most switching systems are designed to provide the best possible service i.e., the least probability of blocking, with the minimum amount of equipment. For commercial purposes, therefore, the emphasis is often placed on increasing the utilization of that equipment which is provided.

Various arrangements are known for reducing internal blocking. For instance, in telephone switching systems there is the well known alternate routing feature. With this feature an attempt is made to interconnect a subscriber over a subgroup of channels to any trunk in a direct-trunk route. If all channels in this subgroup are busy, an alternate trunk route served by a different subgroup of channels is selected, and an attempt is then made to interconnect the subscriber to an alternate route trunk using one of the channels of the second channel subgroup. This arragement has certain disadvantages in that more trunk routes have to be provided. In addition, a portion of traffic between adjacent switching centers may be routed, in the alternative, through high priority tandem switching centers to complete a call to a local office.

Other arrangements are known wherein a common group of overflow channels is provided to serve a large group of subscribers and wherein individual channels are provided to serve smaller subgroups of subscribers within the larger group. With this arrangement the channels individual to the smaller subscriber subgroup are tested first, and if an all-channel-busy condition is encountered, a channel from the common overflow group is selected. This "overflow channel" arrangement has certain advantages in that many subscribers have access to the common high usage overflow group of channels; however, larger switches must be provided or a portion of the individual channels must be sacrificed to provide terminations for the overflow channels.

There are still other systems that reduce blocking by employing multiple appearances of terminals. For instance, a telephone switching system having an arrangement like this may require that the subscriber lines, the trunk lines or both have appearances on many switch frames. With this arrangement an attempt is made to interconnect one appearance of the subscriber line with one appearance of the trunk by "matching" idle components of the channels available to interconnect the two appearances. If all channels serving these appearances are busy, as indicated by a "failure to match," a second attempt is made to interconnect the subscriber with the same trunk by using alternate appearances of the trunk or the line or both. These alternate appearances are of course, served by a different subgroup of channels, thus enabling a "match" to be made between other channel components. This arrangement offers certain disadvantages in that the undue multiplicity of line and trunk appearances requires more switch frame equipment and increases the burden of maintenance.

In addition, there are systems known that provide a surplus of channels so that any terminal may be connected with any other terminal during the "busy-hours." With this arrangement the subscriber is assured of having an available channel; however, the number of channels required is greatly increased over the so-called percentage systems, and many of the channels remain idle during the nonbusy hours.

It is, therefore, one important object of the invention to improve switching systems by reducing internal blocking.

It is another object of the invention to improve channel selecting arrangements in switching systems.

It is a further object of the invention to provide subscribers in switching systems with access to normally unavailable channels.

Another object of the invention is to improve utilization of switching equipment in a switching system.

The invention as set forth in one embodiment described herein is employed in a crossbar telephone switching system of the type described in Patent 2,585,904 issued to Busch on February 19, 1952. It will be recalled that the Busch patent discloses a crossbar telephone switching system employing markers, line link frames, trunk link frames and various other common control equipments. Subscriber lines appear on primary crossbar switches of the line link frames and trunks appear on trunk switches of the trunk link frame. Interposed between the primary line switches and trunk switches are trunk-junctor switches and line-junctor switches.

In the case of a terminating call, a communication channel is established between a particular incoming trunk and a particular subscriber line by interconnecting the trunk switch of the incoming trunk over an idle trunk link to a trunk-junctor switch, interconnecting the trunk-junctor switch over an idle junctor to a line-junctor switch and interconnecting the line-junctor switch over an idle line link to the subscriber line on a line switch.

In the Busch patent, if the call blocked due to the unavailability of a channel in the subgroup associated with the incoming trunk and the called subscriber, the call was not completed, and the incoming trunk returned an overflow signal to the calling office.

In accordance with one embodiment of the present invention two line link frames are "mated" so that junctors normally serving the first frame are given access to the line links of the second or "mate" frame, over an auxiliary crossbar switch. Conversely, the junctors normally serving the second line link frame are given access to the line links of its "mate," the first line link frame, over a similar crossbar switch.

Briefly, when a subscriber in a distant office desires to call a subscriber at the office employing the invention as disclosed herein, an incoming trunk is used in conjunction with an incoming register to receive the called subscriber numerical designation. The called subscriber numerical designation is then translated by a number group circuit into information denoting the location of the subscriber line on a line link frame. This information is forwarded to a marker circuit along with the trunk link frame location of the incoming trunk.

Using the called subscriber line link frame location and the incoming trunk link frame location, the marker can select and test the proper subgroup of channels for interconnecting the incoming trunk with the called subscriber. If the marker shrould encounter an all-channel-busy condition in this subgroup of channels, instead of blocking and returning an overflow signal as in the Busch disclosure, the marker releases the first channel subgroup, seizes control of the "mate" line link frame and tests a channel subgroup serving the "mate" frame. Upon finding an idle channel in a subgroup serving the "mate" frame, an auxiliary switch is actuated to interconnect the idle "mate" junctor with an idle line link on the called subscriber line link frame, thereby completing the connection.

Of course, if no channel is available either directly or by using a "mate" frame junctor subgroup, the incoming trunk would return an overflow signal to the distant office in the same manner as disclosed in the Busch patent.

A feature of this invention is found in the means for providing access to normally unavailable channels.

Another feature of the invention resides in the means for interconnecting channel subgroups so that all interconnectable subgroups have access to terminals served by the individual subgroups.

Still another feature of the invention is found in an auxiliary crossbar switch interconnecting line links on one line link frame with junctors serving another line link frame.

A further feature of the invention resides in means for controlling two line link frames while channel components serving each frame are tested.

More particular features of this invention are found in means for "mating" two line link frames so that all of the channel subgroups unique to each of the frames have access to the "mate" frame using an intersubgroup switching stage, means for testing any subgroup for channel availability, means for designating a desired line to which a call is to be directed and connecting the testing means to the only subgroup serving that desired line, means for ascertaining an all-channel-busy condition as indicated by a failure-to-match of the idle channel components of the subgroup serving the desired line, means for selecting a subgroup serving a different line and for matching idle channel components of the subgroup serving the other line with idle channel components serving the desired line, and means for controlling an intersubgroup switching stage for interconnecting the idle channel components of the two subgroups.

These and other objects and features of the invention will become more clearly understood from consideration of the following description with reference to the drawings in which:

FIGS. 1 and 2 when arranged in accordance with FIG. 23 show a block diagram of one specific illustrative embodiment of our invention as employed in a crossbar telephone system of the type disclosed in the Busch patent;

Figure 7:
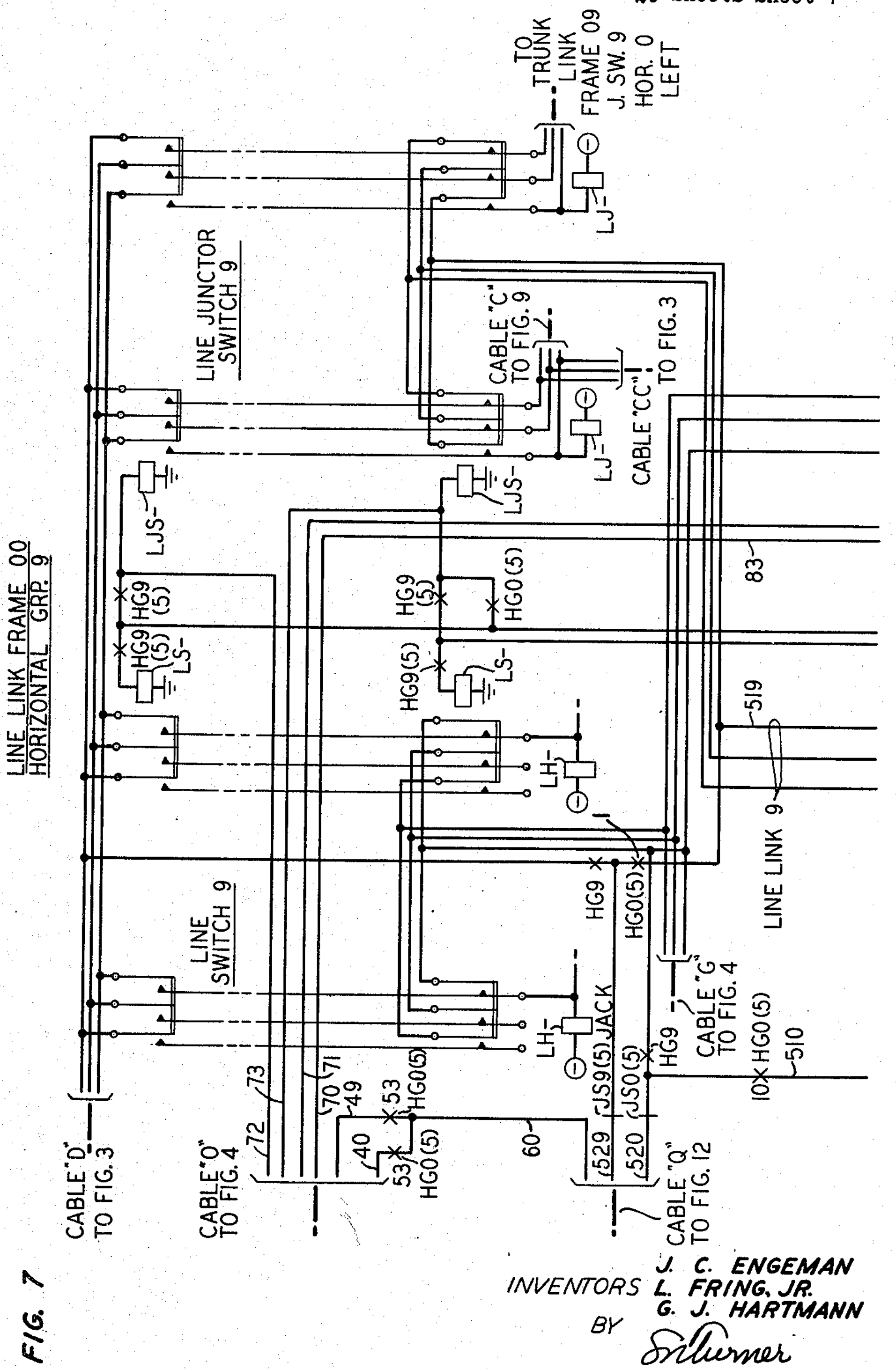
Figure 8:
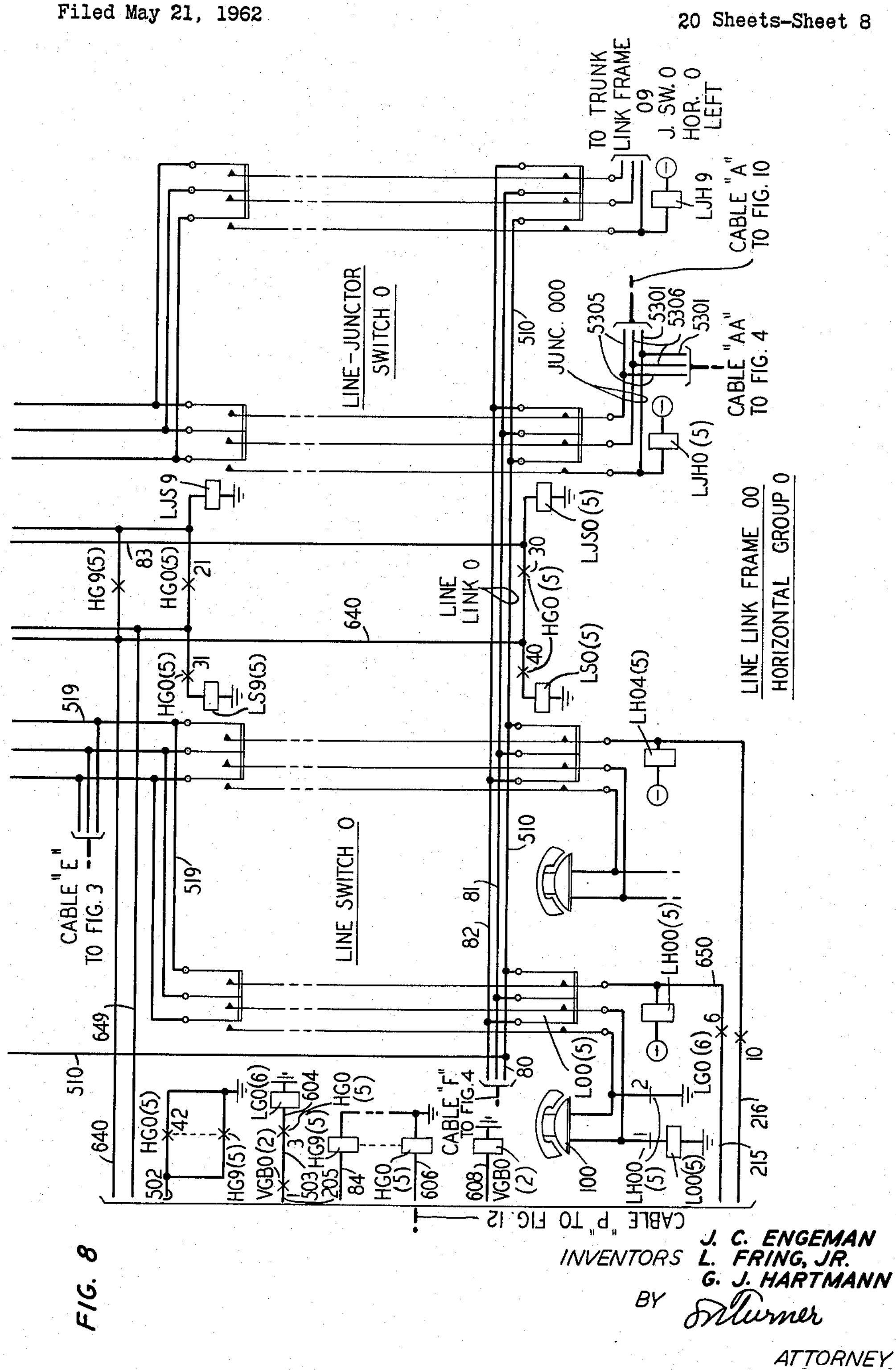
Figure 9:
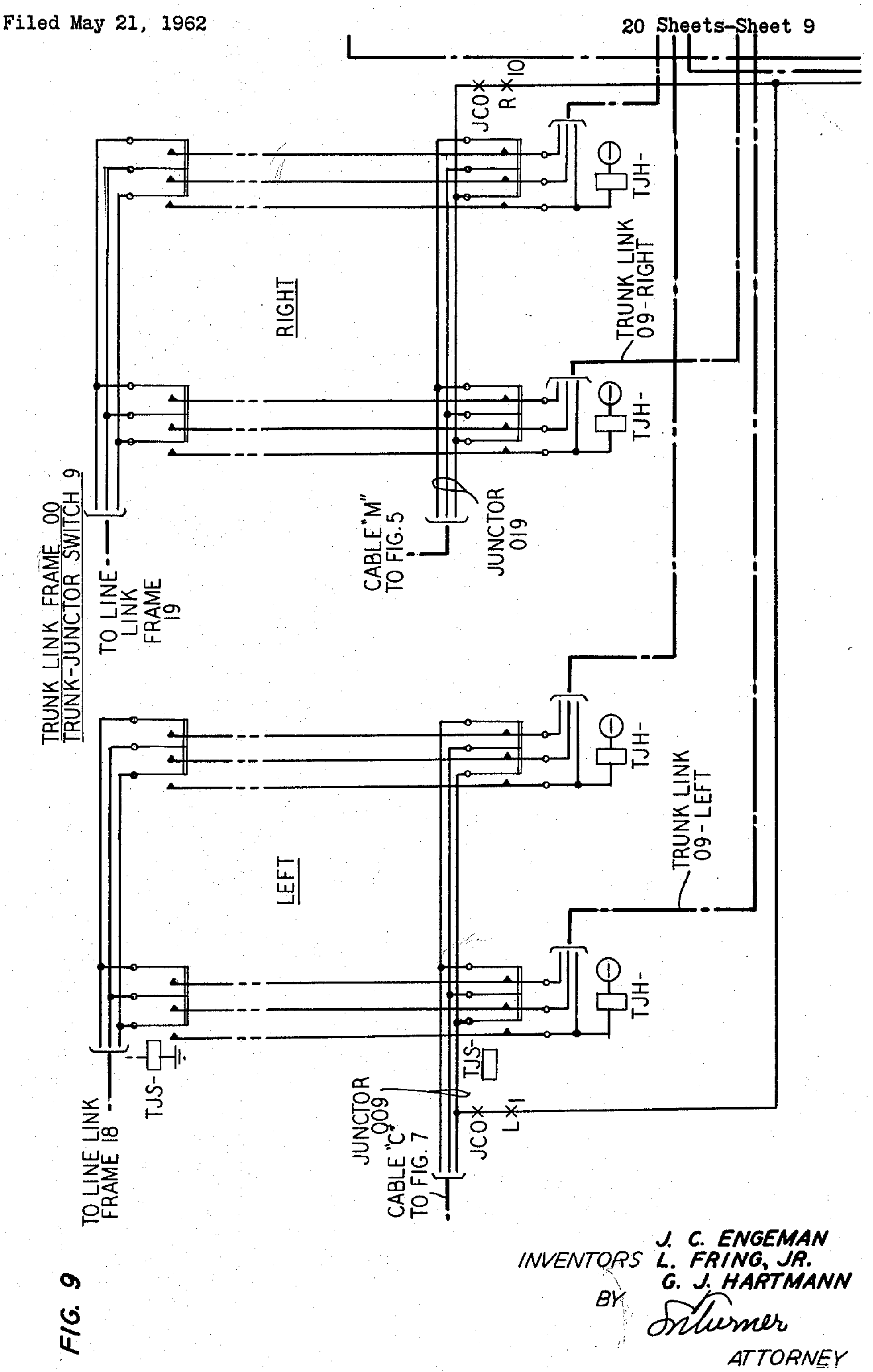
Figure 10:
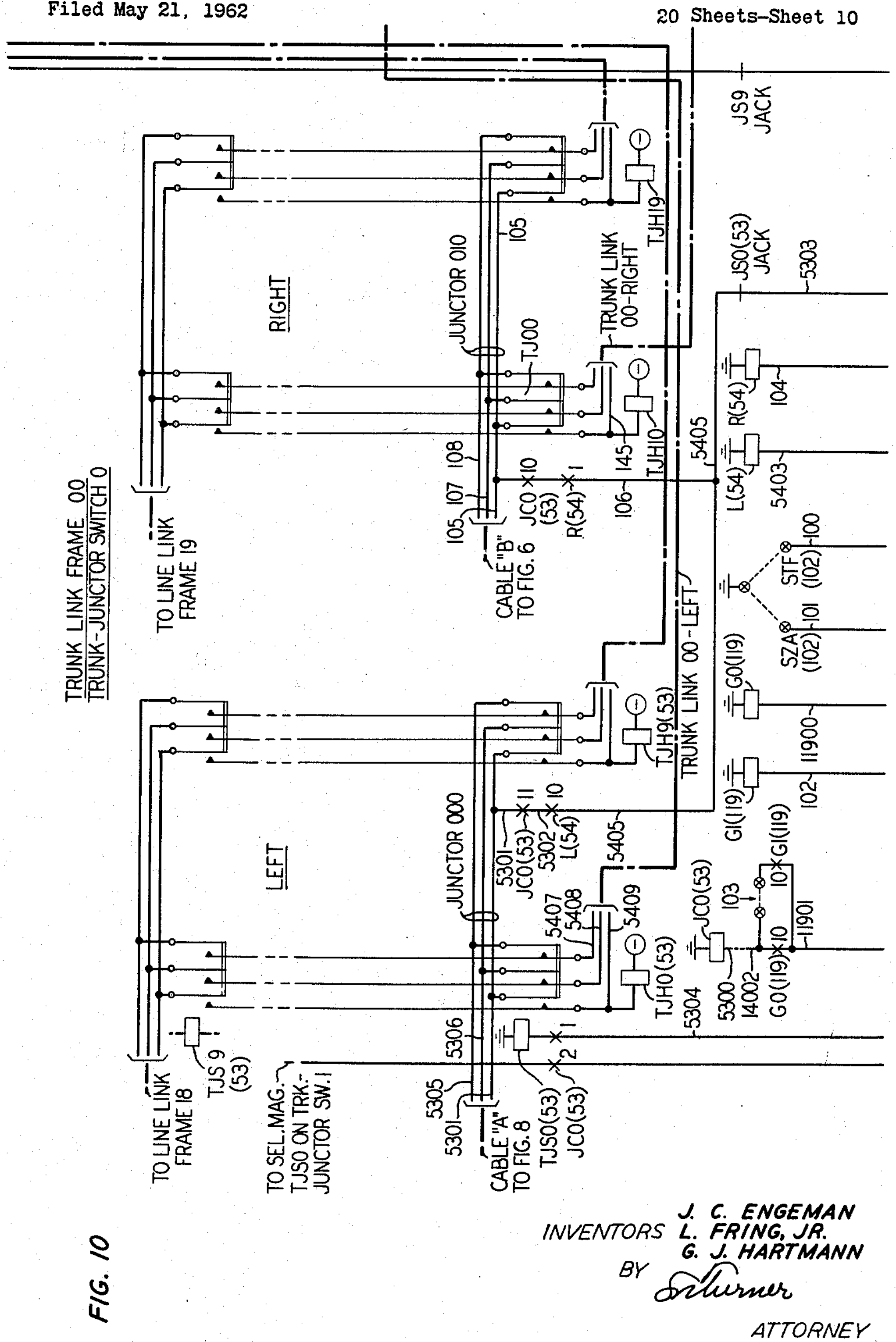
Figure 11:
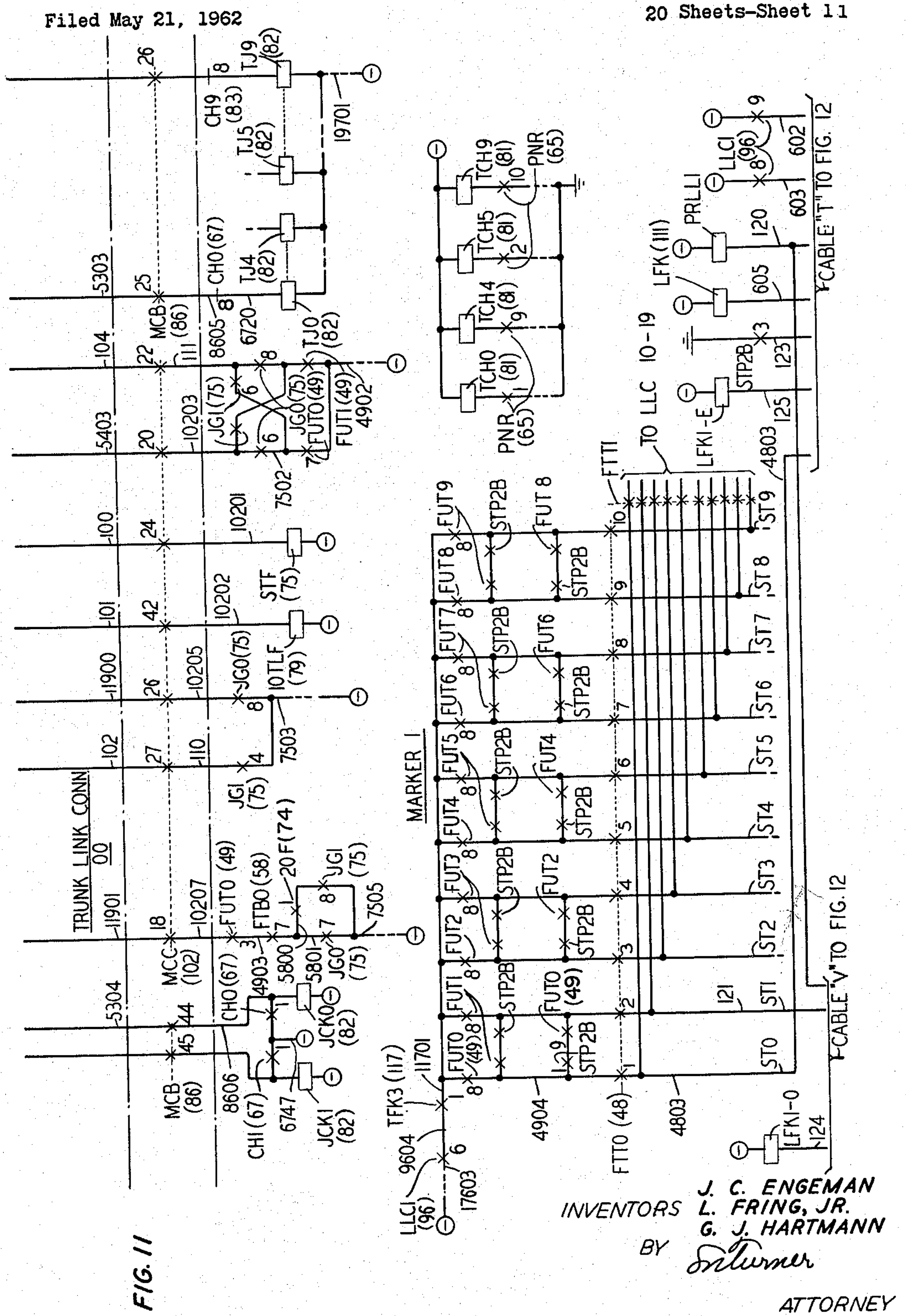
Figures 12, 21, 22:
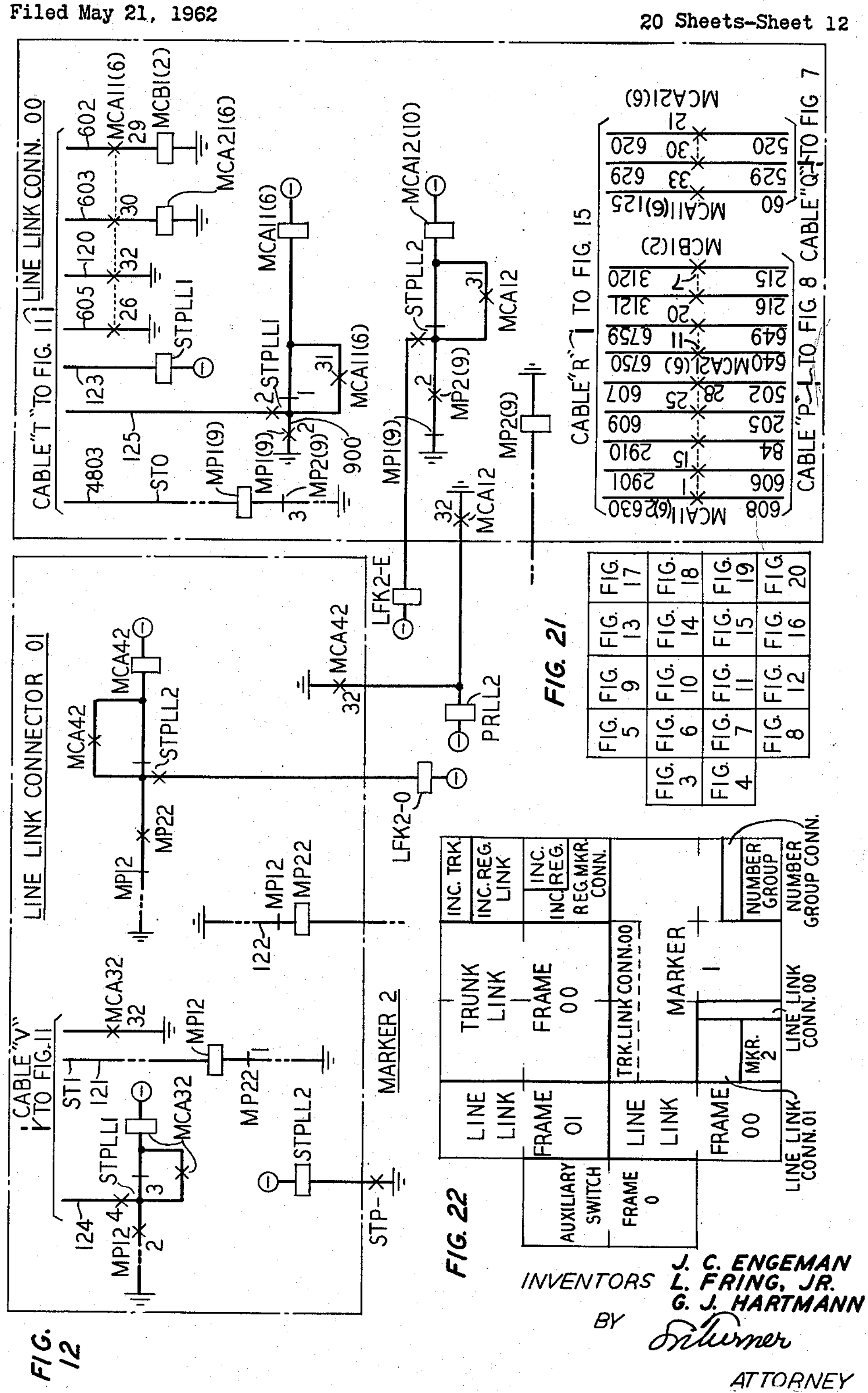
Figure 13:
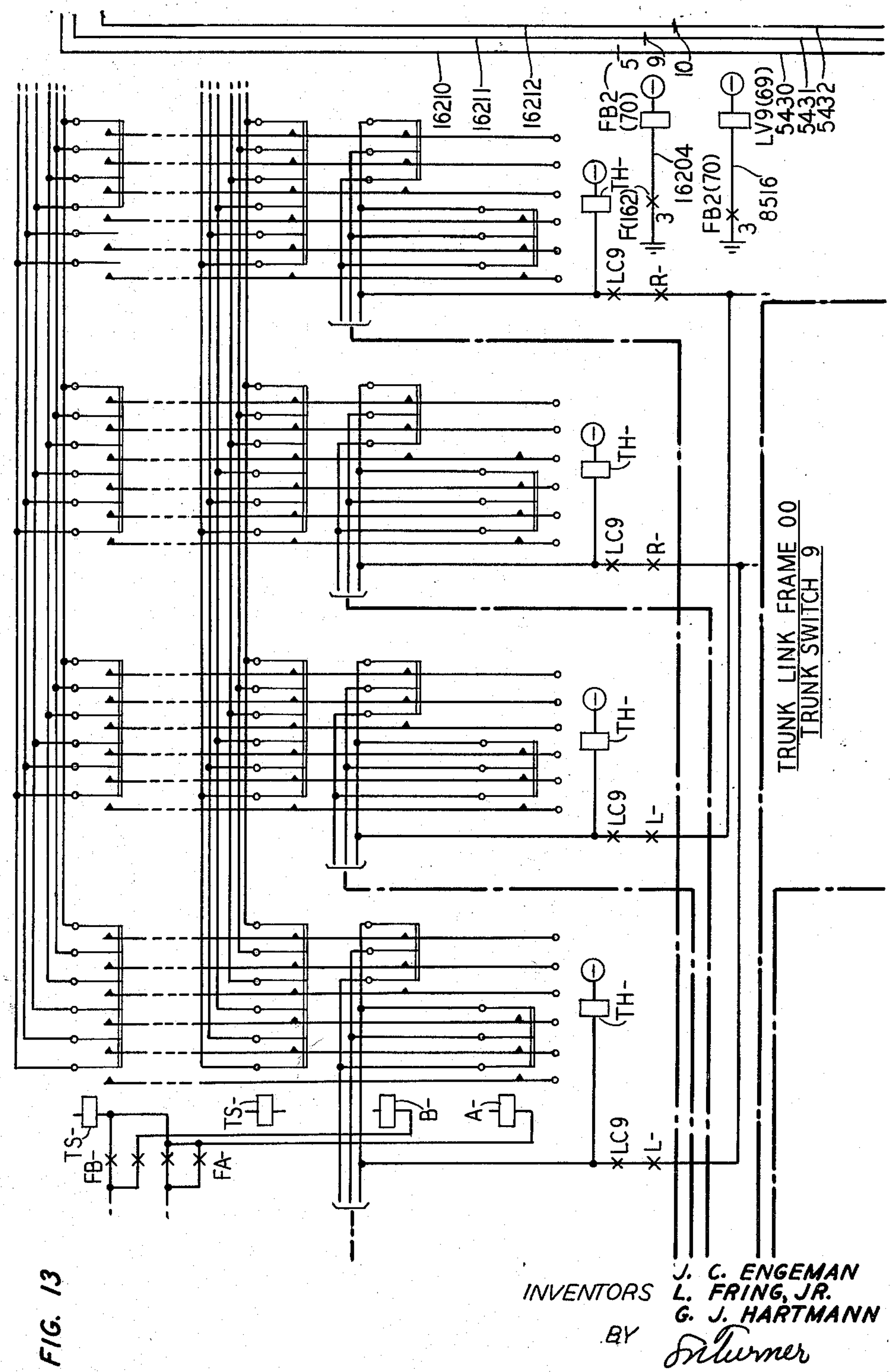
Figure 14:
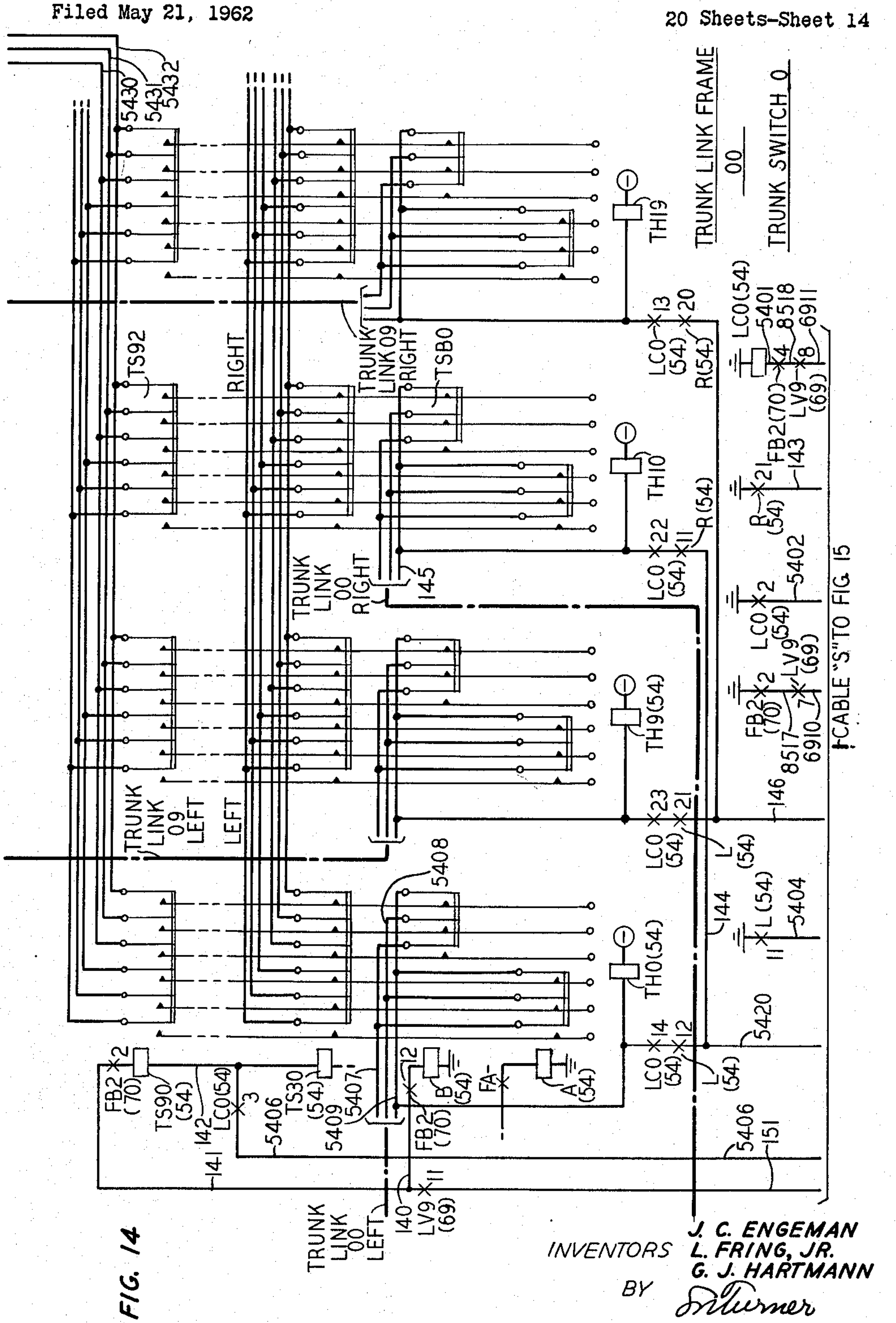
Figure 15:
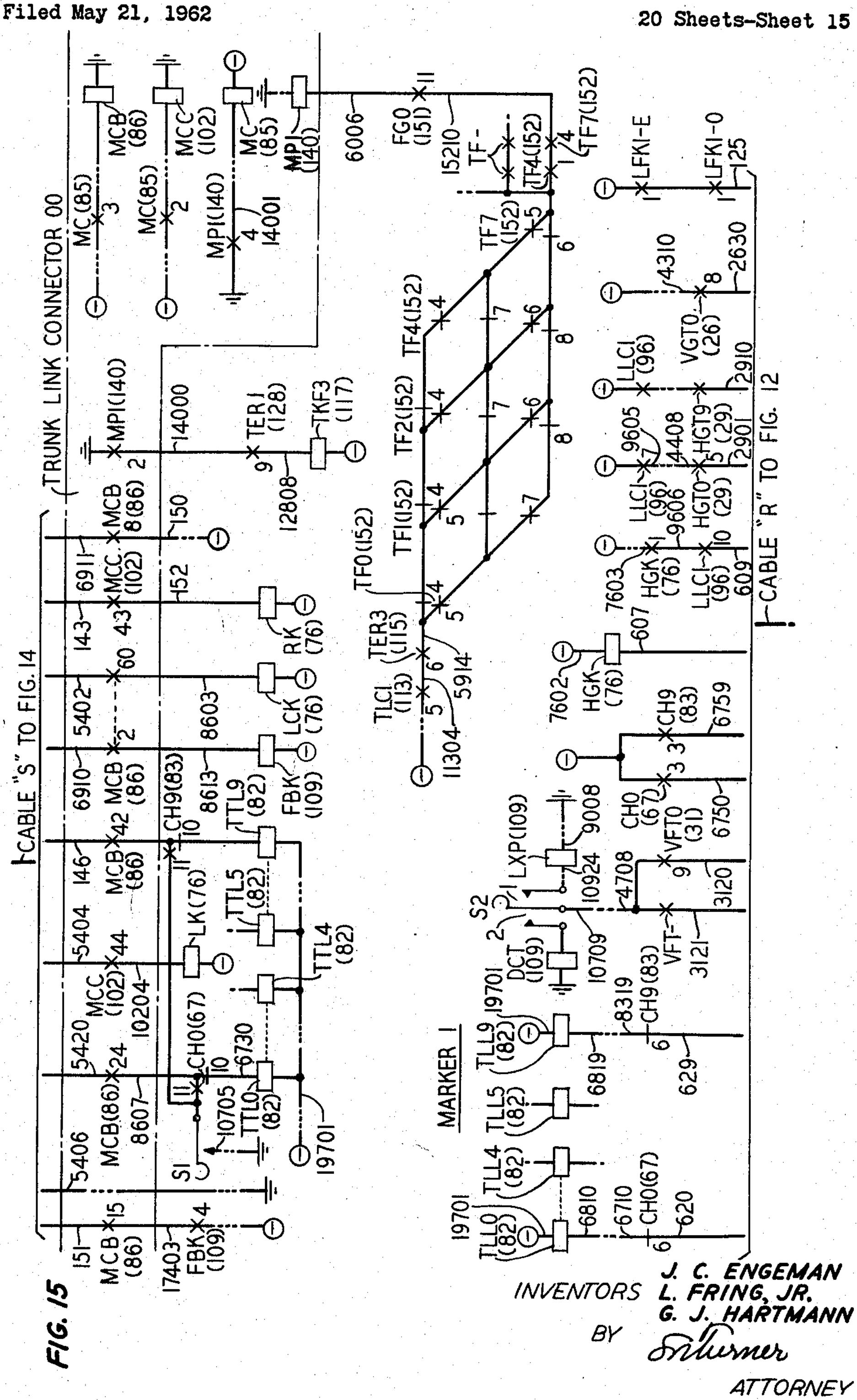
Figure 16:
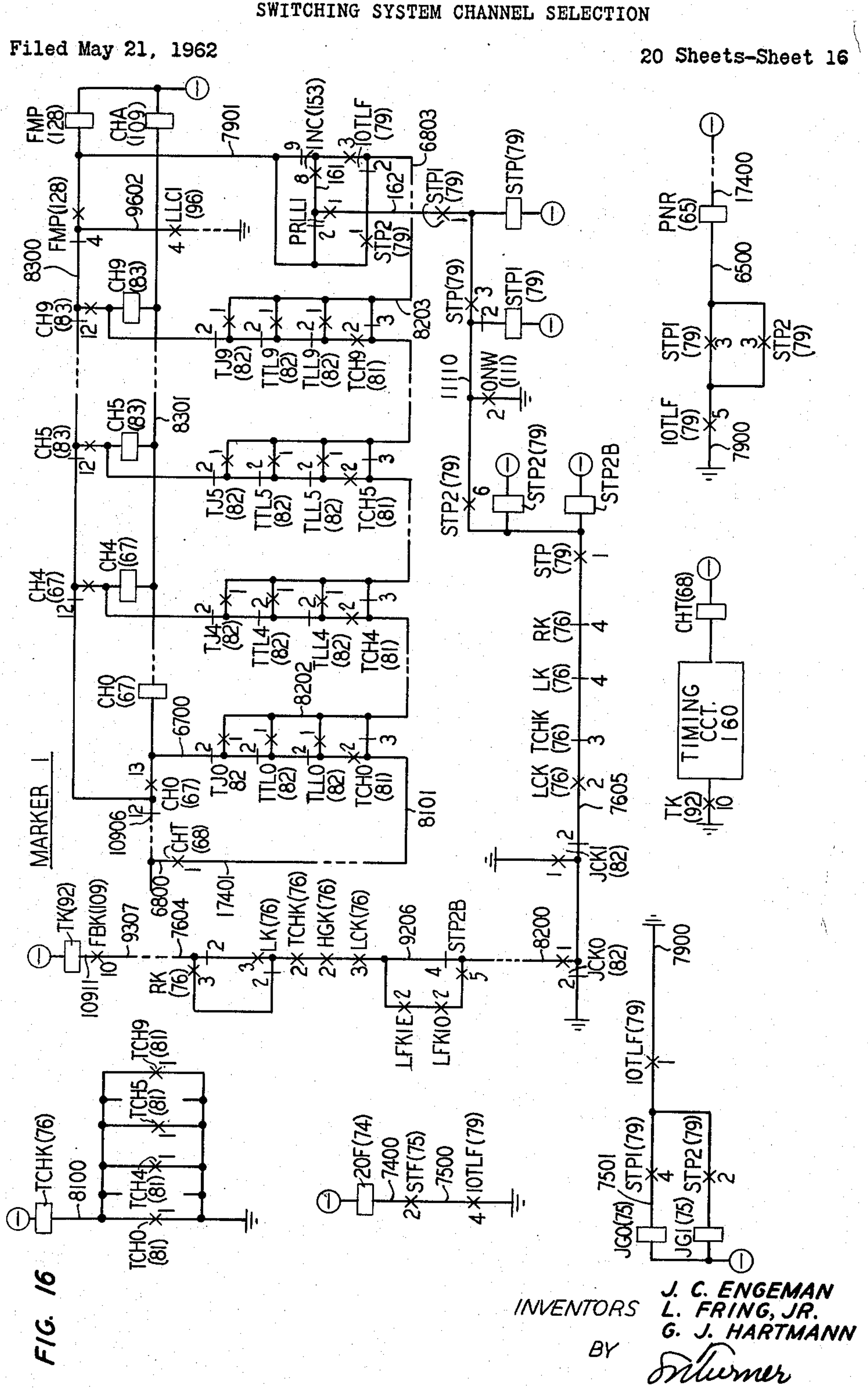
Figure 17:
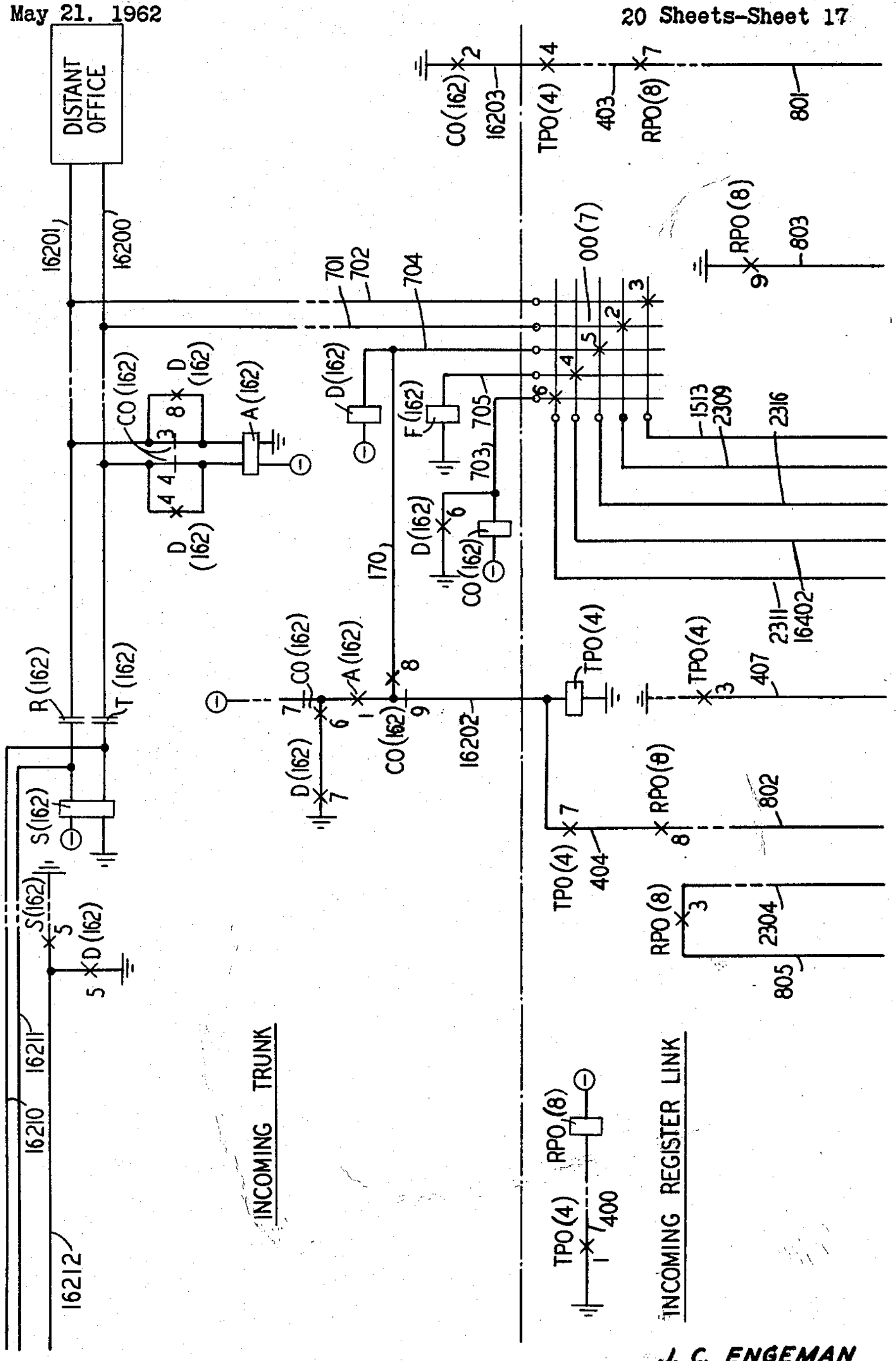
Figure 18:
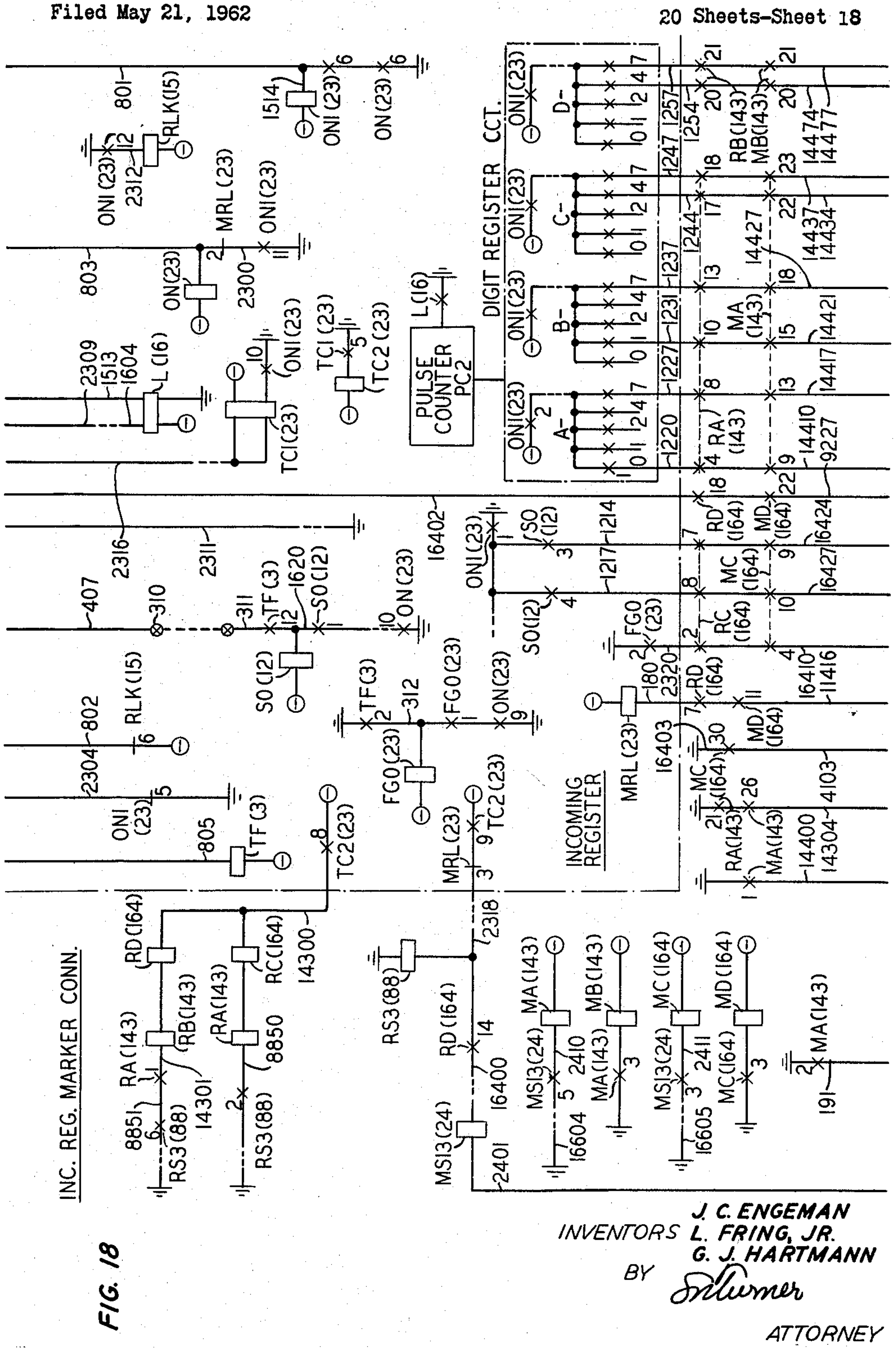
Figure 19:
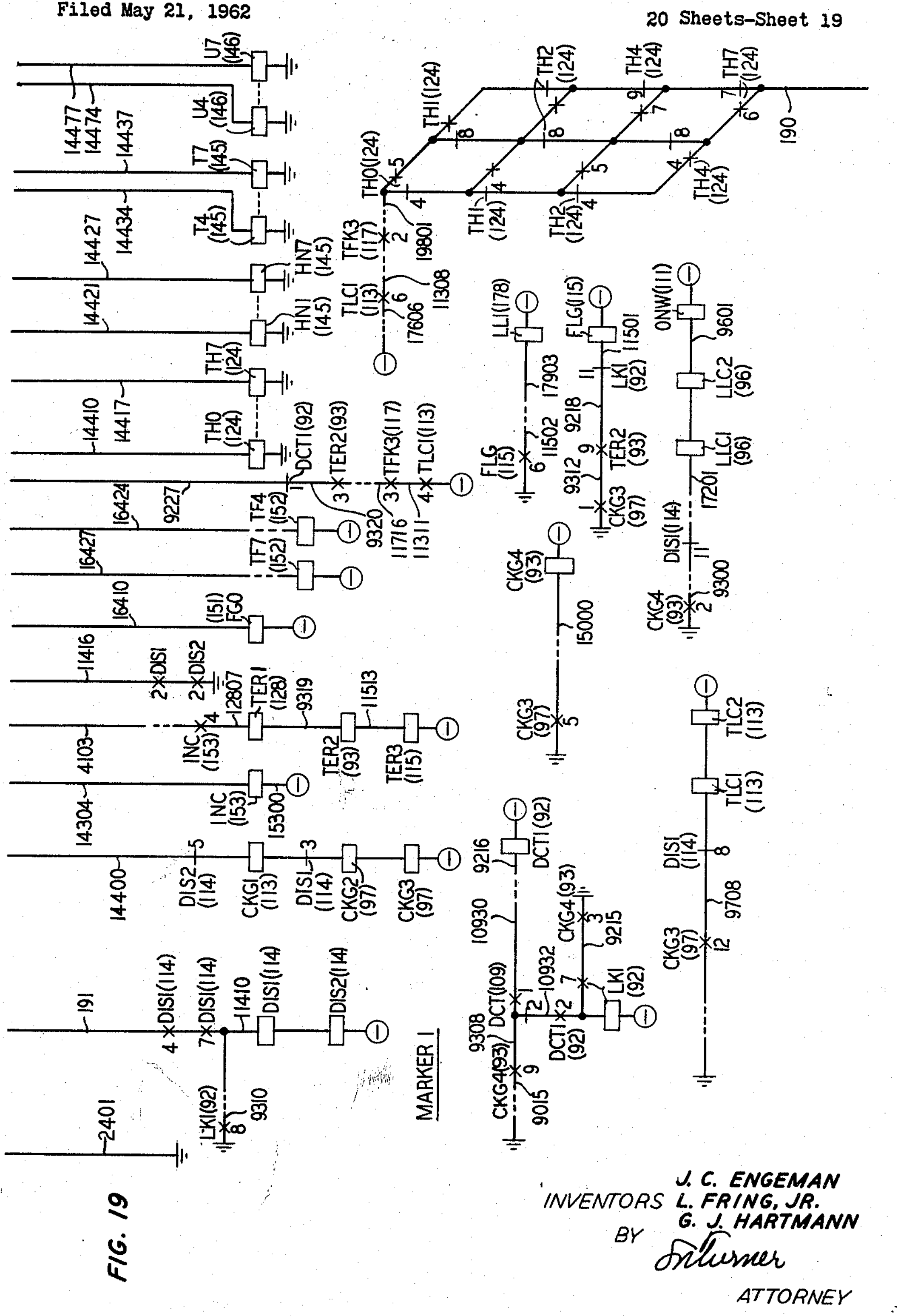
Figure 20:
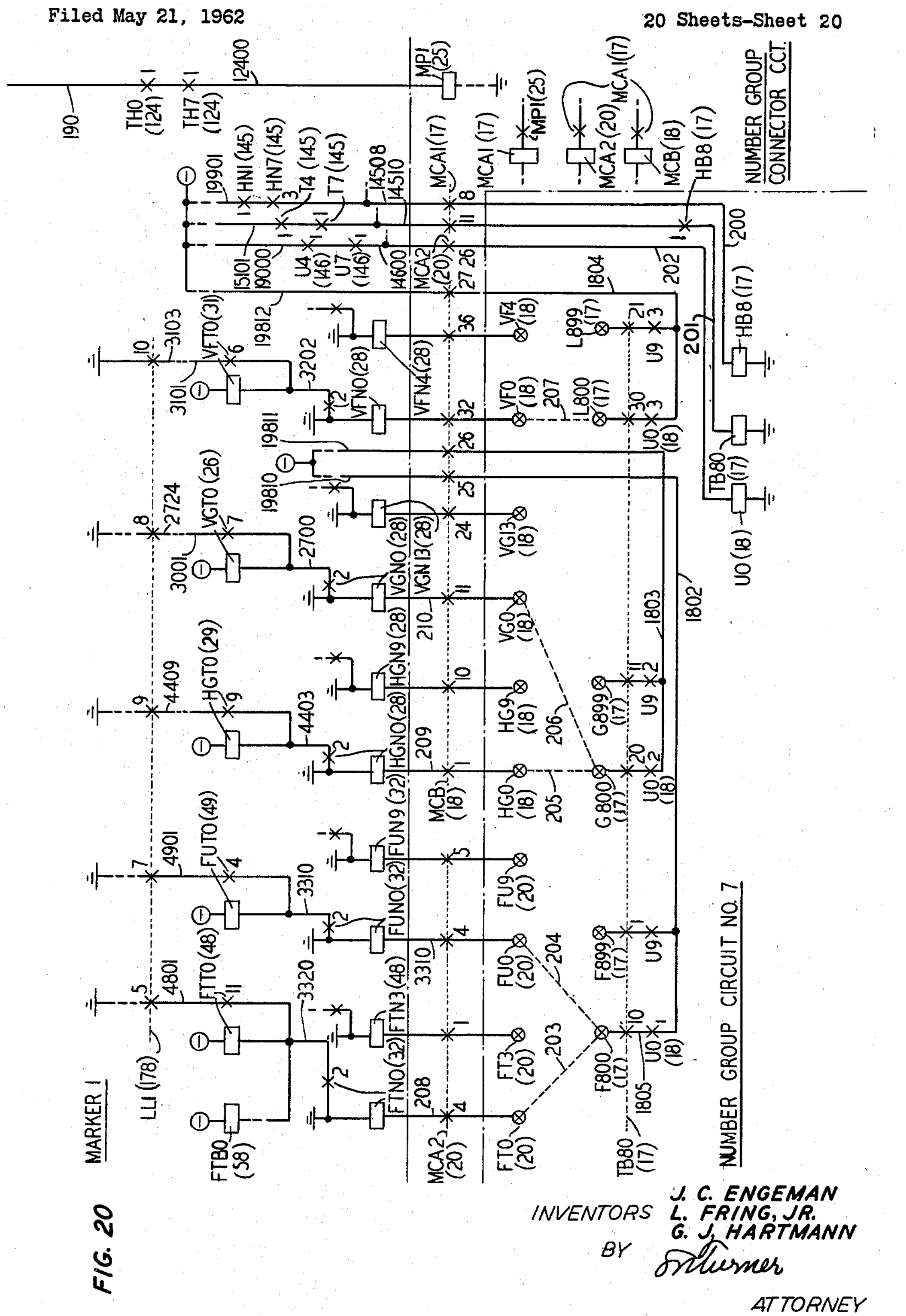

FIGS. 7 and 8 show line link frame 00 which is "mated" to line link frame 01;

FIGS. 9 and 10 show the trunk-junctor switches and FIGS. 13 and 14 show the trunk switches for trunk link frame 00;

FIG. 17 shows part of an incoming trunk and part of an incoming register link circuit;

FIG. 18 shows part of an incoming register and part of an incoming register marker connector;

FIGS. 11 and 15 show part of the circuitry for marker 1 and trunk link connector 00;

FIG. 20 shows a portion of a number group, number group connector circuit, and part of marker 1;

FIGS. 16 and 19 show the remaining portion of marker 1;

FIG. 12 shows line link connectors 00 and 01 and part of marker 2;

FIG. 21 shows the arrangement of FIGS. 3 through 20; and

FIG. 22 is a diagram similar to FIG. 21 but indicating the location of the various elements of the system.

*General description*

Figures 1, 23:
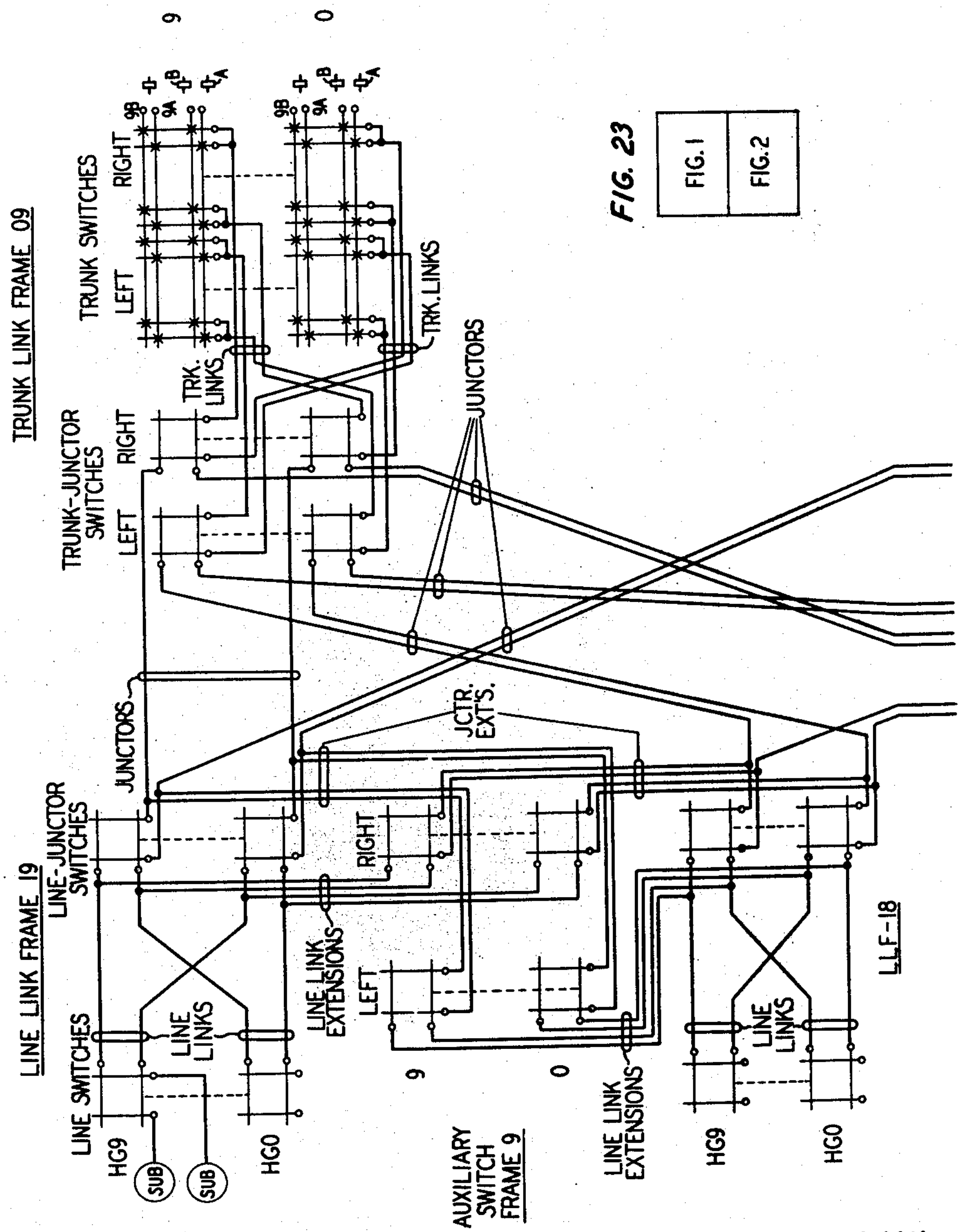
Figure 2:
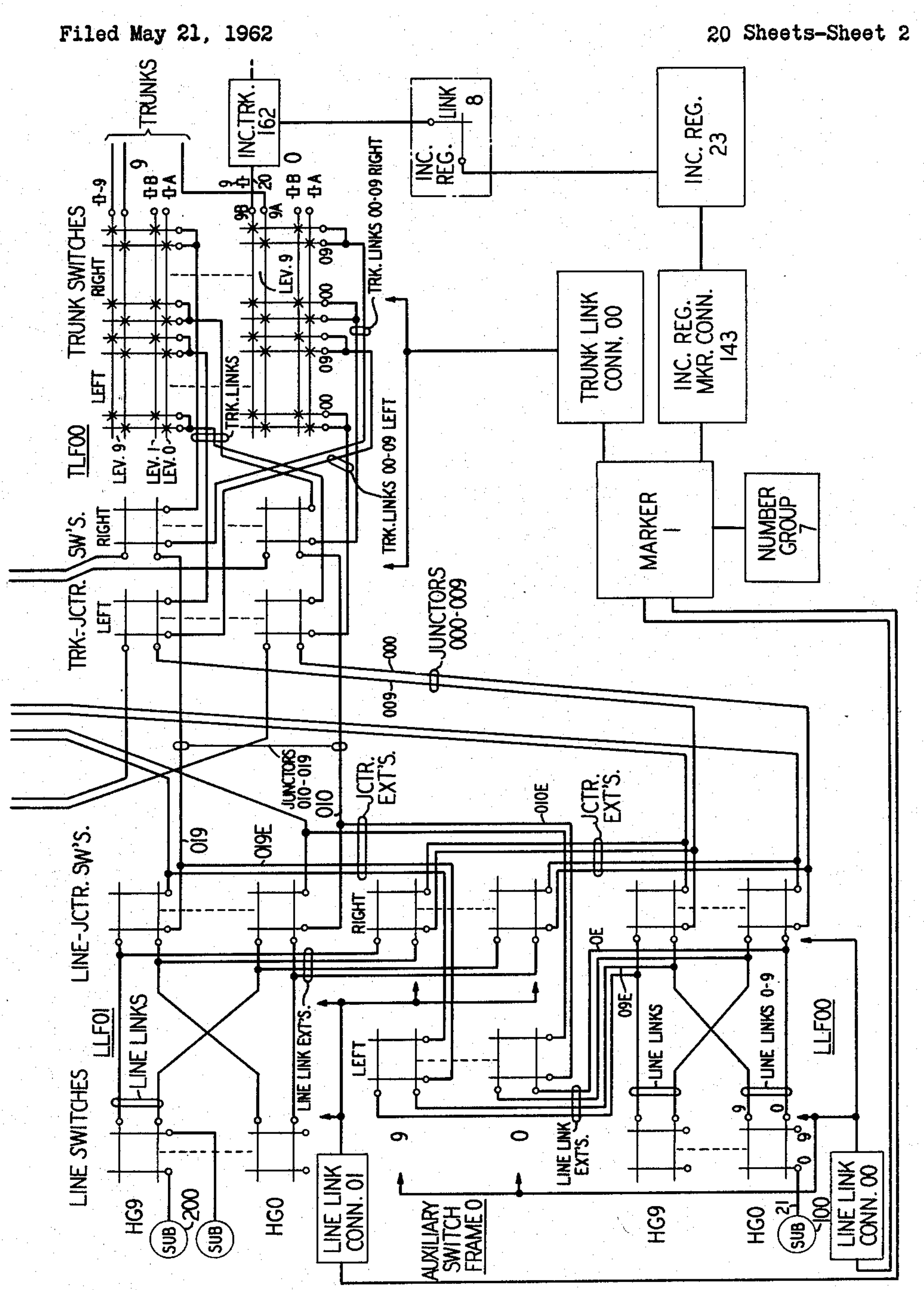

FIGS. 1 and 2 contain a symbolic representation of a specific illustrative embodiment of the invention employed in a crossbar telephone system such as the system disclosed in the aforementioned Busch patent. For illustrative purposes, there is shown a system employing twenty line link frames, ten trunk link frames and that common control equipment necessary for establishing a terminating call. It will become more apparent from the following description that the invention can be used in many other types of switching systems of varying size and is not limited to use on a terminating call in the system disclosed by Busch.

Each line link frame, of which only frames 00, 01, 18 and 19 are shown, includes crossbar switches arranged in ten horizontal groups designated HG0 to HG9. Each horizontal group contains a line-junctor switch and at least one line switch. The verticals of the line switch are connected to subscriber lines, while the horizontals are connected to line links which are arranged so that there is one line link connecting each line switch with each line-junctor switch. If traffic conditions permit, additional line switches may be added to the existing line switches by connecting their horizontals in multiple throughout.

Each trunk link frame has ten trunk switches and ten trunk-junctor switches, each being divided into right and left halves. The verticals on the left halves of the trunk-junctor switches are connected by trunk links to the verticals on the left halves of the trunk switches. Similarly, trunk links are connected between the right halves of the trunk-junctor and trunk switches. These trunk links are arranged so that each trunk switch is connected to each trunk-junctor switch.

There are two three-wire trunks connected to each of the horizontals or levels 2 through 9 of each of the trunk switches. For instance, incoming trunk 162 of FIG. 2 is connected to level 9B on trunk switch 0 of trunk link frame 00, and it will readily be seen that another trunk can be accommodated on level 9A of the same switch. The two appearances on each of levels 2 to 9 are obtained by using a six wire crossbar switch and operating the select magnet A or B at the level 0 or 1 in addition to the select magnet of the level such as select magnet 9 on which the trunk 162 appears. The A or B select magnet controls the crosspoint which connects the trunk link to one or the other of two vertical multiples thereby obtaining 16 three-wire trunk appearances for each trunk switch having six horizontal conductors per level.

The trunk-junctor switches are split vertically, and the horizontals of the left halves are connected by junctors to the verticals on even-numbered (00, 02, et cetera to 018) line link frames, while the horizontals of the right halves are connected by junctors to the verticals on odd-numbered (01, 03 et cetera to 019) line link frames.

Each odd-numbered line link frame is "mated" with a different even-numbered line link frame by an auxiliary switch frame. For instance, line link frame 00 is "mated" with line link frame 01 by auxiliary switch frame 0 of FIG. 2.

The auxiliary switch frame 0 includes ten horizontal groups of 0 to 9 of auxiliary crossbar switches corresponding to the ten horizontal groups HG0 to HG9 of line-junctor switches on the "mated" line link frames. The horizontal groups of auxiliary switches are divided into left and right sections. Each of the horizontals on the left-section switches is connected over a line link extension to a different line link of the even-numbered frame, while each of the horizontals on the right-section switches is connected to a different line link on the odd-numbered "mate" frame. The verticals of the left-section auxiliary switches are connected by means of junctor extensions to the junctors, such as junctors 010 and 019, serving the odd-numbered line link frame while the verticals of the right-section auxiliary switches are connected by similar junctor extensions to the junctors, such as junctors 000 and 009, serving the even-numbered line link frame.

All switching-operations are under control of a common marker, such as marker 1, which has access to a line link frame via a line link connector, such as line link connector 00 associated with line link frame 00. The marker also has access to all trunk link frames, such as trunk line frame 00, via an associated trunk link connector 00.

An incoming call from a distant office causes the seizure of an incoming trunk, such as incoming trunk 162, which responds by connecting to an incoming register 23 through an incoming register link 8.

It is the function of the incoming register 23 to receive the called subscriber number as it is transmitted from the calling office by any one of the well known pulsing arrangements. In addition, the incoming register 23 receives, via the incoming register link 8, information as to the trunk link frame location, such as trunk frame 00, of the incoming trunk 162.

When the incoming register 23 is connected with the incoming trunk 162, a signal is returned to the distant office and the numerical designation of the called subscriber is outpulsed from that distant office and into the incoming register. The incoming register 23 receives and records the called subscriber number, and in addition, records the trunk link frame number from the incoming register link 8. Both the trunk link frame number and the called subscriber numerical designation are then forwarded to the marker 1 through incoming register marker connector 143. The marker responds and seizes the identified trunk link frame 00 via its trunk link connector 00. It thereupon calls on a number group circuit, such as number group 7 to translate the called subscriber's telephone number into an equipment location on a line link frame.

When the marker has ascertained the called subscriber's line link frame location from the number group circuit 7 and the incoming trunk location on the trunk link frame from the incoming register link 7, it selects a subgroup of channels for interconnecting the two frames. For instance, in FIG. 2 incoming trunk 162 has its conductors 20 connected to an appearance 9B of trunk switch 0 on trunk link frame 00. Let it be assumed that a call is to be directed from incoming trunk 162 to subscriber 100 which is located on line link frame 00, horizontal group 0, vertical 0. Upon determining the location of subscriber 100 and the location of incoming trunk 162, marker 1 selects and tests a channel subgroup including trunk links 00 to 09–left, junctors 000 to 009, and line links 0 to 9.

If all channels in this subgroup are busy, the marker seizes control of the "mate" line link frame 01 via line link connector 01. Having obtained control of line link frame 01 to prevent other markers from seizing that frame, marker 1 then selects and tests a subgroup of channels serving line link frame 01 including trunk links 00 to 09–right and junctors 010 to 019. If an idle channel is detected in this subgroup, incoming trunk 162 can be interconnected with subscriber 100 by interconnecting the idle junctor (of junctors 010 to 019) of line link frame 01 with an idle line link 0 to 9 of line link frame 00 using one of the left-section auxiliary switches on the auxiliary switch frame.

More specifically, if it is determined that a channel is idle, the transmission conductors 20 of incoming trunk 162 would be extended over trunk link 00-right, over junctor 010, over junctor extension 010E, through crosspoint on auxiliary switch ASW0, over line link extension 0E and over line link 0 to the line conductors 21 of subscriber 100 thereby completing the connection.

Conversely, if the call is to be directed to a subscriber, such as subscriber 200, on line link frame 01, the channel subgroup including junctors 010 to 019 would be tested first. Upon finding an all channel busy in this subgroup, the channel subgroup including junctors 000 to 009 may be used by interconnecting an idle junctor in this subgroup with an idle line link on line link frame 01 using the appropriate right-section auxiliary switches.

DETAILED DESCRIPTION

In the detailed circuits of FIGS. 3 to 20 there is shown the invention employed in a simplified version of the Busch Patent 2,585,904. It will be recalled that in the Busch disclosure there is described in considerable detail many types of service calls such as a dial tone connection, an intraoffice call, an incoming call, a subscriber outgoing call, etc. It will be understood that this invention can be used for many types of calls, but for the purpose of illustration, this description will be confined to an incoming call and, therefore, most of the equipment used on other types of calls in the Busch patent has been omitted from the instant drawings. The equipment that has been omitted, in general, is represented by dashed lines.

Wherever possible, the equipment in this disclosure has been given a letter designation representative of its functional characteristics. Equipment, similar to that found in the Busch patent, has been given the same functional letter designation as in Busch, followed by a number in parenthesis which indicates the figure in the Busch Patent 2,585,904 on which that equipment can be found. Wherever possible, conductors have been given the same numerical designation as the corresponding conductors found in the Busch patent. In addition, where several conductors are grouped into cables, the cables are given a letter designation with a notation indicating to which figure the cable is extended.

*Incoming call*

When a subscriber at a distant office wishes to converse with a subscriber at the office disclosed herein, a bridge will be connected at the calling office across the tip and ring conductors of an interoffice trunk leading to the latter office. For example, the calling office would place a bridge across conductors 16200 and 16201 of FIG. 17 thereby completing a circuit from battery through the left winding of relay A(162), contact 4 of the C0(162) relay, through trunk equipment (not shown), and over conductor 16200, through the bridge at the distant office (not shown) and back over conductor 16201, through trunk equipment (not shown), through contact 3 of the C0(162) relay and through the right winding of relay A(162) to ground. Relay A(162) operates in this circuit and closes a circuit from battery through trunk equipment (not shown), through contact 7 of relay C0(162), through contact 1 of relay A(162), through contact 9 of relay C0(162) over the start conductor 16202 for the incoming register link circuit to ground through the winding of trunk preference relay TP0(4) thereby operating the TP0(4) relay in the incoming register link.

The incoming register link comprises a plurality of crossbar switches having incoming trunks terminated on their verticals and incoming registers of the desired type terminated on their horizontals. Each trunk is associated with a trunk preference relay, such as TP0(4), and these TP-relays are arranged in a preference chain with a common start lead to the incoming registers. Each register has a register preference relay, such as RP0(8), and a register busy relay (not shown) associated with it for each crossbar switch on the incoming register link.

Assuming that incoming register 0 was idle when relay TP0(4) operated, ground is connected through contact 1 of relay TP0(4), over conductor 400 and through register busy relays for other registers (not shown) to the winding of RP0(8) operating the RP0(8) relay. If incoming register 0 had been busy, one of its register busy relays would be operated extending the ground to a register preference relay (not shown) for a different incoming register.

Relay RP0(8) in operating connects ground at its contact 9 over conductor 803 to FIG. 18 as a start signal for the associated incoming register in FIG. 18. This ground completes the operating path for relay ON(23) of the incoming register.

At this point several operations take place in the incoming register circuit. These operations are described in considerable detail in the Busch patent and need not be reiterated for a full understanding of the present disclosure. Some of these operations include making the incoming register appear busy to other incoming trunks and preparing the incoming register for receiving the called line numerical designation and the incoming trunk link frame location. In addition, crosspoints 00(7) on the incoming register link in FIG. 17 are closed under control of the incoming register. The incoming register is now connected with the trunk over the incoming register link switch, and that switch is being held operated by contacts (not shown) of the ON(23) relay in the incoming register.

The register shown in FIG. 18 is not unlike that found in the Busch Patent 2,585,904. It will be recalled that Busch disclosed an incoming register of the revertive pulse type which registers the called numerical digits on a crossbar switch. In addition, the trunk link frame number, as received from the incoming register link, is registered on the same crossbar switch.

The circuitry shown in FIG. 18 represents a typical incoming register having a relay L(16) which is responsive to impulses from the distant central office. Relay L(16) actuates a pulse counter (PC2) which counts the pulses for each digit and registers each digit on the A- through D-digit register relays in the well known two-out-of-five manner. Relay S0(12) shown in FIG. 18 represents the crosspoints of the crossbar switch used by Busch to register the trunk link frame number.

*Registration of trunk line frame number*

With relay TP0(4) and RP0(8) operated, the incoming register is given an indication of the trunk link frame on which the incoming trunk appears. Ground is connected through contact 5 of relay ON1(23) in FIG. 18 over conductor 2304 to FIG. 17, through unoperated register preference relay contacts (not shown), through contact 3 of relay RP0(8), back over conductor 805 to FIG. 18 and through the winding of trunk frame relay TF(3) to battery. Relay TF(3) operates in this circuit, and with TP0(4) operated, a circuit is closed to operate relay S0(12). This circuit can be traced from ground in FIG. 17 through normally closed contacts of unoperated trunk preference relays (not shown), through contact 3 of relay TP0(4) over conductor 407 to FIG. 18 and to cross-connecting rack 310 where it is connected to conductor 311 which extends through contact 12 of relay TF(3), over conductor 1620 and through the winding of the S0(12) relay to battery. Relay S0(12) operates and locks over its contact 1 through equipment not shown to ground at contacts 10 of the ON(23) relay.

Relay TF(3), at its contact 2, connects a ground over conductor 312 and through the winding of relay FG0(23) in FIG. 18 to indicate to the register that the tens digit of the trunk link frame number is 0. Relay FG0(23) operates and locks over its contact 1 to ground at contact 9 of relay ON(23).

When crosspoints 00(7) in FIG. 17 closed under control of the incoming register, pulse responsive relay L(16) of FIG. 18 was connected to the incoming trunk. This circuit can be traced from battery through the left winding of relay L(16) in FIG. 18, over conductor 1604, through incoming register equipment (not shown), over conductor 2309 to FIG. 17, through contact 2 of crosspoint 00(7), over conductor 701, and through trunk equipment (not shown) to the tip conductor 16200 leading to the distant office. Ground is connected through the right winding 5 of relay L(16), over conductor 1513 to FIG. 17, through contact 3 of crosspoint 00(7), over conductor 702 where it is extended through trunk equipment (not shown) to the ring conductor 16201 leading to the distant office. Relay L(16) may or may not operate at this time since it is parallel with the windings of relay A(162) in the trunk.

When the trunk frame tens and units digits have been registered, as indicated by the operation by relays FG0(23) and S0(12) in FIG. 18, a circuit is closed from ground in FIG. 18, through equipment (not shown), over conductor 2311 to FIG. 17, through contact 6 of crosspoint 00(7), over conductor 703 to battery through the winding of relay C0(162) in the trunk circuit of FIG. 17.

Relay C0(162) operates in this circuit opening at its contact 9, the start circuit for the incoming register link; however, relay TP0(4) remains locked operated in a circuit traced from ground through its winding and its contact 7, over conductor 404, through contact 8 of relay RP0(8), through contacts of other register preference relays (not shown), thence over conductor 802 to FIG. 18 and through contact 6 of the RLK(15) relay to battery. At its contacts 3 and 4, the C0(162) relay disconnects the windings of relay A(162) from the trunk conductors to provide a clear pulsing path between the distant office and the incoming register. At its contact 2, relay C0(162) connects ground over conductor 16203, through contact 4 of relay TP0(4), through the normally closed contacts of other trunk preference relays (not shown) to conductor 403, thence through contact 7 of relay RP0(8) and the normally closed contacts of the other register preference relays (not shown), over conductor 801 to FIG. 18 and over conductor 1514 to battery through the winding of relay ON1(23). Relay ON1(23) operates in this circuit and locks through its own contact 6 and through contact 6 of relay ON(23) to ground.

When relay ON1(23) operates a locking circuit is established for relay ON(23) which extends from ground at contact 11 of relay ON1(23), over conductor 2300, through contact 2 of relay MRL(23) to the winding of relay ON(23) and battery.

Relay ON1(23) connects ground to a plurality of conductors the function of which will be described below.

At its contact 12, relay ON1(23) connects ground over conductor 2312 to battery through the winding of relay RLK(15) operating the latter relay. At its contact 5, relay ON1(23) disconnects ground from conductor 2304 to release the TF(3) relay thereby opening the circuit over which the trunk frame number was received to prevent a false trunk number registration should another register in the group be seized immediately following the operation of the RLK(15) relay.

Relay RLK(15), upon operating, removes battery from conductor 802 to release trunk preference relay TPO(4), and in turn, TP0(4) releases register preference relay RP0(8).

*Registration of called line number*

With relay L(16) of FIG. 18 connected to the trunk, the register is ready to receive impulses from the sender in the distant office. Relay L(16) responds to each series of pulses representing a digit of the called subscriber number and actuates pulse counter PC2 accordingly. At the end of each digit, the digital information registered in the pulse counter PC2 is forwarded to the digit register circuit and stored on a two-out-of-five basis on registration relays A- through D- of which only the work contacts are shown in FIG. 18. The pulse counter is then reset at the end of each digit so that the next pulse series can be counted and stored.

For this illustration it has been assumed that no office directing code is required, and only a four digit number, representative of the subscriber's telephone number, is to be received. It will be understood that registers of this type are often equipped to receive more than four digits thereby enabling the marker to direct the call to many 10,000 line office units or to a successive central office on a switch through basis.

For the purpose of illustration, let it be assumed that the incoming register has received and registered the called subscriber telephone number 7800 on the A-, B-, C- and D-registration relays. On a two-out-of-five basis, relays A0 and A7 representing the digit 7, B1 and B7 representing the digit 8, C4 and C7, D4 and D7, each representing the digit 0, would be operated and locked to contacts on either the ON(23) or ON1(23) relay. The operating and locking paths for these relays have not been shown since it is well known in the art and is not pertinent to a full understanding of the present invention.

When the last, or "D" digit, is registered a signal is sent to the incoming register to cause the register to return the control of the incoming trunk to the distant office. Equipment in the incoming register (not shown) is operated to close a circuit for operating the D(162) relay in the trunk. This circuit can be traced from ground in FIG. 18, through contact 10 of relay ON1(23), through the lower winding of relay TC1(23), through register equipment (not shown) over conductor 2316 to FIG. 17, through contact 5 of crosspoint 00(7), over conductor 704 and through the winding of relay D(162) to battery. Relay D(162) operates and establishes the trunk transmission condition by reconnecting the relay A(162) to the tip and ring conductors. When relay D(162) operates it also connects ground through its contact 6 to conductor 703 to hold relay C0(162) operated.

When relay A(162) is reconnected to the trunk conductors it reoperates and closes a locking circuit for relay D(162) which may be traced from battery through the winding of the D(162) relay, over conductor 170 through contact 8 of relay C0(162), through contact 1 of relay A(162), through contact 6 of relay C0(162) to ground at contact 7 of relay D(162).

Relay TC1(23) of FIG. 18 did not operate in the previously traced operating circuit for the D(162) relay, since the current flow established in the lower winding of the TC1(23) relay opposes the current flow in its upper winding. However, when relay D(162) in the trunk locks, its locking ground is extended back over the previously traced operating path to conductor 2316 in FIG. 18 as an indication to the register that the D(162) relay has operated and locked, and this ground shunts the lower winding of relay TC1(23). Relay TC1(23) now operates closing an obvious circuit over its contact 5 to cause the operation of relay TC2(23) and the register is now ready to seize control of a marker through an incoming register marker connector.

*Operation of incoming register marker connector*

When relay TC2(23) operates it closes a start circuit for the incoming register marker connector in FIG. 18.

This circuit may be traced from battery, through contact 9 of the TC2(23) relay, through contact 3 of relay MRL(23), through equipment (not shown) and over conductor 2318 to ground through the winding of the register preference relay RS3(88) of the incoming register marker connector. Relay RS3(88) operates in this circuit and if no other incoming register is attempting to seize the marker at this time, it closes an operating circuit for the register multicontact relays RA(143) and RC(164). This circuit may be traced from ground through contacts of other register preference relays (not shown), through contact 2 of relay RS3(88), over conductor 8850 and through the windings of relays RA(143) and RC(164), over conductor 14300 and through contact 8 of relay TC2(23) to battery. With relay RA(143) operated a circuit for operating relays RB(143) and RD(164) is closed through contacts of other register preference relays (not shown), through contact 6 of relay RS3(88), over conductor 8851, through contact 1 of relay RA(143), over conductor 14301 and through the windings of relays RB(143) and RD(164) to battery over conductor 14300 as traced above.

With multicontact relays RA(143), RB(143), RC(164) and RD(164) of FIG. 18 operated, the incoming register is connected to the common wiring of the incoming register marker connector.

Relay RD(164) closes a start circuit for the marker preference relays from battery on conductor 2318 as above traced, through contact 14 of relay RD(164), over conductor 16400 and through connector control equipment (not shown), through the winding of marker preference relay MS13(24) and over conductor 2401 to ground in the marker in FIG. 19. Relay MS13(24) of FIG. 18 operates and, assuming that no other circuit is attempting to seize this marker at this time, closes a circuit from ground on conductor 16604, through contacts of other marker preference relays (not shown), through contact 5 of relay MS13(24), over conductor 2410, to battery through the winding of multi-contact relay MA(143). Relay MA(143) operates and, at its contact 3, closes a circuit for operating relay MB(143). Relay MS13(24) closes a similar circuit from ground on conductor 16605, through its own contact 3 and over conductor 2411 to battery through the winding of relay MC(164) operating that relay which in turn operates relay MD(164) in an obvious circuit.

With multicontact relays MA(143), MB(143), MC(164), MD(164) of FIG. 18 operated the common wiring of the connector is extended to the preferred marker so that the incoming register of FIG. 18 is now connected over a plurality of circuits to FIG. 19 of the marker.

*Preparation of marker for operation*

Relay MA(143) at its contact 1 connects ground over conductor 14400 to FIG. 19, through contact 5 of relay D1S2(114), through the winding of relay CKG1(113), thence through contact 3 of relay D1S1(114) and through the windings of relays CKG2(97) and CKG3(97) operating the CKG1(113), CKG2(97) and CKG3(97) relays.

Relay CKG3(97), in operating, closes ground through its contact 12, over conductor 9708, through contact 8 of relay D1S1(114) and through the windings of relays TLC1(113) and TLC2(113) to battery operating these relays.

With relays RA(143) and MA(143) operated a circuit is closed from ground in FIG. 18, through contact 21 of relay RA(143), through contact 26 of relay MA(143), over conductor 14304 to FIG. 19 and through the winding of relay INC(153) to battery on conductor 15300. The operation of relay INC(153) informs the marker that it has been seized by an incoming register in response to a call incoming from a distant office.

With relay INC(153) operated, a circuit is closed from battery, through the winding of relay TER3(115) in FIG. 19, over conductor 11513, through the winding of relay TER2(93), over conductor 9319, through the winding of relay TER1(128), thence over conductor 12807, through contact 4 of the INC(153) relay, through marker equipment (not shown) to the incoming register marker connector of FIG. 18 over conductor 4103, through contact 30 of relay MC(164) and over conductor 16403 to ground. Relays TER1(128), TER2(93) and TER3(115) operate in this circuit and prepare the marker to handle a terminating call. Relay TER2(93) closes a circuit from battery, through the winding of relay FLG(115) in FIG. 19, over conductor 11501, through contact 11 of relay LK1(92), over conductor 9218, through contact 9 of relay TER2(93) and over conductor 9312 to ground at contact 1 of relay CKG3(97). Relay FLG(115) operates in this circuit and connects ground through its contact 6, over conductor 11502, through marker equipment (not shown), over conductor 17903 and through the winding of relay LL1(178) to battery operating the LL1(178) relay.

When relay CKG3(97) operated it closed through an operating path for relay CKG4(93) which can be traced from battery through its winding over conductor 15000, through marker equipment (not shown) and through contact 5 of the CKG3(97) relay to ground. Relay CKG4 (93), in operating, closes at its contacts 2, ground over conductor 9300, through marker equipment (not shown), through contact 11 of the D1S1(114) relay and through marker equipment (not shown), over conductor 17201, through the winding of LLC1(96), through the winding of the LLC2(96), over conductor 9601, through the winding of the ONW(111) relay to battery operating relays LLC1(96), LLC2(96) and ONW(111) in FIG. 19. Relay ONW(111), at its contact 2 in FIG. 16, connects ground over conductor 11110, through contacts 2 of relay STP(79) and through the winding of relay STP1(79) to battery operating the STP1(79) whose function will be described later.

The CKG-, the LLC-, and the TLC- relays closes through numerous operating circuits to be described later.

*Transfer of called line designation to marker*

When the multicontact relays of the incoming register marker connector have been operated, as described above, a plurality of circuits are closed for transferring the called line designation and the number of the trunk link frame on which the incoming trunk appears from the incoming register in FIG. 18 to the marker in FIG. 19.

The operation of relays MC(164) and RC(164) has extended, from the incoming register to the marker, a group of trunk link frame units leads and a trunk link frame tens lead to identify the trunk link frame associated with the incoming trunk circuit. It will be recalled that relay S0(12) and relay FG0(23) were operated in the incoming register circuit of FIG. 18 indicating that the incoming trunk appeared on trunk link frame 00. A circuit is now closed from contact 2 of FG0(23) in FIG. 18, over conductor 2320, through contact 2 of relay RC (164), through contact 4 of relay MC(164), over conductor 16410 to FIG. 19 and to battery through the winding of relay FG0(151) in the marker. Two circuits are established from ground through contact 1 of the ON1 (23) relay, through contacts 3 and 4 of the S0(12) relay, over conductors 1214 and 1217, through contacts 7 and 8 of relay RC(164) and through contacts 9 and 10 of relay MC(164), over conductors 16424 and 16427 to FIG. 19 and to battery through the windings of relays TF4(152) and TF7(152).

The number of the trunk link frame trunk assumed to be 00 has now been registered in the marker on the frame tens relay FG0(151) and the frame units relays TF4(152) and TF7(152) of FIG. 19.

Since it was assumed that only a four digit number is to be used and no office directing code is required, the called subscriber number, as registered on the A-, B-, C- and D-relays in the incoming register of FIG. 18, can be transferred directly to the thousands, hundreds, tens and units register relays in FIG. 19 of the marker on a two-out-of-five basis.

It was assumed that the called subscriber number was 7800 and that the A0 and A7 relays, the B1 and B7 relays, the C4 and C7 and D4 and D7 relays were operated in the incoming register digit register cricuits. When the marker is connected to the incoming register through the incoming register marker connector, each of the digit register relays in the incoming register operates a corresponding relay in the thousands, hundreds, tens and units register of the marker. For instance, a path can be traced from ground through contact 2 of the ON1(23) relay in the incoming register, through contact 1 of the A0 relay, over conductor 1220, through contact 4 of RA(143), through contact 9 of MA(143), over conductor 14410 to FIG. 19 and through equipment in the marker (not shown) to battery through the winding of relay THO(124). Similar circuitry can be traced for operating the thousands relay TH7(124), hundreds relays HN1(145) and HN7(145), tens relays T4(145) and T7(145), units relays U4(146) and U7(146) thereby registering the called subscriber number 7800 in the marker.

*Trunk link frame seizure*

As soon as relay TER3(115) in the marker operated, a circuit was closed from battery in FIG. 15, through marker equipment (not shown), through contact 5 of the TLC1(113), over conductor 11304, through contact 6 of relay TER3(115), over conductor 5914, through contact 4 of relays TF0(152), TF1(152), TF2(152), and TF4(152), through contact 5 of relay TF7(152), contact 1 of relay TF4(152), and contact 4 of relay TF7(152), over conductor 15210, through contact 11 of FG0(151), over conductor 6006 and to ground through the winding of marker preference relay MP1 (140) in the trunk link connector for trunk link frame 00. When trunk link frame 00 is available, relay MP1(140) operates and closes a circuit for operating relay MC(85). This circuit can be traced from battery, through the winding of relay MC(85), through connector control equipment (not shown) over conductor 14001, and through contact 4 of MP1(140) to ground. Relay MC(85) in operating, closes through obvious operating circuits for multicontact relays MCB(86) and MCC(102, thereby connecting the marker as shown in FIGS. 11 and 15 to trunk link frame 00 shown in FIGS. 9, 10, 13 and 14.

When relay MP1(140) operated it connected ground through its contact 2 and over conductor 14000, through contact 9 of relay TER3(128), over conductor 12803 to battery through the winding of relay TFK3(117) operating the TFK3(117) relay in FIG. 15 to indicate that the marker has successfully seized the trunk line frame.

With relay TFK3(117) operated, a circuit is closed from battery in FIG. 19 over contact 4 of relay TLC1(113), over conductor 11311, through contact 3 of relay TFK3(117), over conductor 11716, through marker equipment (not shown), through contact 3 of relay TER2(93), over conductor 9320, through contact 1 of relay DCT1(92), over conductor 9227 to the incoming register marker connector in FIG. 18, through contact 22 of relay MD(164), through contact 18 of relay RD(164), over conductor 16402 to FIG. 17, through contact 4 of crosspoint 00(7) in the incoming register link, over conductor 705 and through the winding of relay F(162) in the incoming trunk to ground. Relay F(162) operates in this circuit closing a circuit from ground at its contact 3, over conductor 16204 in FIG. 13 to battery through the winding of relay FB2(70). Relay FB2(70) operates and at its contact 3, connects ground to conductor 8516 to operate level relay LV9(69) of FIG. 13. With relay FB2(70) and LV9(69) operated link connector relay LC0(54) in FIG. 14 operates from battery in FIG. 15 of the marker, over conductor 150, through contact 8 of relay MCB(86), over conductor 6911 in cable "S" to FIG. 14, through contact 8 of relay LV9(69), thence over conductor 8518, through contact 4 of the FB2(70) relay, over conductor 5401 and through the winding of relay LC0(54) to ground.

The marker is informed that relays FB2(70), LV9(69) and LC0(54) have operated by the operation of check relays FBK(109) and LCK(76). The operating path for the FBK(109) relay can be traced from battery through its winding in FIG. 15, over conductor 8613, through contact 2 of relay MCB(86), over conductor 6910 in cable "S" to FIG. 14, through contact 7 of relay LV9(69), over conductor 8517 and through contact 2 over relay FB2(70) to ground. Relay LCK(76) in FIG. 15 operates in a circuit from battery through its winding, over conductor 8603, through contact 60 of the MCB(86) relay, over conductor 5402 in cable "S" to FIG. 14 and through contact 2 of relay LC0(54) to ground.

The operation of the FBK(109) relay completes a circuit for operating the B(54) select magnet and the TS90(54) select magnet on trunk switch 0 (FIG. 14) of trunk link frame 00. This circuit can be traced from battery in FIG. 15 of the marker, through marker equipment (not shown), through contact 4 of relay FBK(109), over conductor 17403, through contact 15 of relay MCB(86), over conductor 151 in cable "S" to FIG. 14, through contact 11 of relay LV9(69), thence over conductor 140, through contact 12 of relay FB2(70) and through the winding of the B(54) select magnet to ground. At contact 11 of relay LV9(69) this same battery is extended over conductor 141 through contact 2 of relay FB2(70), through the winding of trunk select magnet TS90(54), thence over conductor 142, through contact 3 of relay LC0(54), over conductor 5406 in cable "S," through the trunk link connector of FIG. 15 and equipment in the marker (not shown) to ground. Select magnets TS90(54) and B(54) in operating, prepare the crossbar switch for crosspoint closure so that trunk conductors 16210, 16211 and 16212 in FIG. 17 can be connected to an idle trunk link of an idle channel.

After the marker has successfully seized control of the trunk link frame, it is ready to translate the called subscriber's number into a line link frame location by using a number group circuit.

*Operation of the number group circuit*

The purpose of the number group circuit is to translate the called subscriber number into a line link frame location. Each number group circuit is equipped to translate 1000 directory numbers, and by examining the thousands digit of the called number the marker can ascertain the number group circuit required to translate the particular called subscriber number It will be remembered that thousands register relays TH0(124), TH7(124) in FIG. 19 had been operated in accordance with the thousands digit "7" of the assumed called number 7800. When the marker has ascertained connection to trunk link frame 00, as indicated by the operation of relay TFK3(117), a start lead to the appropriate number group circuit, namely number group 7, is energized. This circuit can be traced in FIG. 19 from battery, through marker equipment (not shown), over conductor 17606, through contact 6 of relay TCL1(113), over conductor 11308, through contact 2 of relay TFK3(117), through marker equipment (not shown) and over conductor 19801, thence through contact 5 of relay TH0(124), through contact 8 of relays TH1(124), TH2(124) and TH4(124), through contact 6 of the TH7(124) relay, over conductor 190 to FIG. 20 through contact 1 of relay TH0(124), thence through contact 1 of relay TH7(124), over conductor 12400 to the connector circuit for the #7 number group where it extends through the winding of marker preference relay MP1(25) and over normally closed contacts of other marker preference relays (not shown) to ground. Assuming that number group circuit #7 is available and no other marker preference relays are operated, relay MP1(25) can operate.

Upon operation, relay MP1(25) operates a plurality of multicontact connector relays MCA1(17), MCA2(20) and MCB(18) to connect the marker to the number group circuit. Only the windings and contacts of the number group connector multicontact relay have been shown in FIG. 20, but it will be understood that the operation of connecting the marker to the number group through the number group connector relays is similar in manner to the way the marker was connected to the trunk link frame through the trunk link connector multicontact relays.

The number group circuit is now ready to translate the called subscriber number 7800 into an appropriate line link frame location.

Contacts of the hundreds register (HN-) relays of the marker in FIG. 20 connect battery to one of ten conductors leading to the number group circuit where they are extended to the windings of ten hundreds-block relays; however, only the hundreds-block relay HB8(17) has been shown. Since relays HN1(145) and HN7(145) have been operated, a circuit is closed from battery, through marker equipment (not shown), over conductor 19901, through contact 1 of relay HN1(145), through contact 3 of relay HN7(145), over conductor 14508, through contact 8 of number group connector relay MCA1(17), over conductor 200 and through the winding of relay HB8(17) to ground, operating the HB8(17) relay.

Contacts of the tens register (T-) relays in FIG. 20 of the marker connect battery to one of ten conductors leading to the number group circuit where these ten conductors extend through contacts of the ten hundreds-block relays so that one of 100 tens-block relays in the number group circuit can be operated corresponding to the combination of the hundreds and tens digit of the called number. Only tens-block relay TB80(17) has been shown, and the operating circuit for relay TB80(17) can be traced from ground through its winding, over conductor 201, through contact 1 of relay HB8(17), through contact 11 the MCA(17) connector relay, over conductor 14510, through contact 1 of relay T7(145), through contact 1 of relay T4(145), thence over conductor 15101 and through marker equipment (not shown) to battery.

Contacts of the units register (U-) relays in FIG. 20 of the marker connect battery to one of ten conductors leading to the number group circuit to operate one of the units relays in that circuit. Since relays U4(146) and U7(146) have been operated, a circuit is closed from battery in the marker, through marker equipment (not shown), over conductor 19000, through contact 1 of relay U4(146), through contact 1 of relay U7(146), over conductor 14600, through contact 26 of number group connector relay MCA2(20), over conductor 202 and through the winding of relay U0(18) to ground operating the latter relay.

Each number group circuit has 1000 sets of F-, G- and L- terminals corresponding to the 1000 directory numbers individual to the number group circuit. With one units relay and one tens-block relay operated one set of terminals is marked by having battery extended to them from conductors 19810, 19811, and 19812 in the marker.

Corresponding to the F-, G- and L- terminals there are three sets of translator terminals which are used for transmitting to the marker the location of the called line and the kind of ringing current required. One set of terminals namely, the FT- and FU- terminals, provides the identity of the line link frame on which the called line is located in terms of the tens and units digits of the line link frame number. The second set, HG- and VG- terminals, identifies the line group in terms of the horizontal group and the vertical group on the line link frame on which the called line is located. The third set, of which only the VF- terminals are shown, identifies the vertical file of the line group in which the line is located and the RC- terminal (not shown) identifies the type of ringing current required for that particular subscriber.

Assuming that number designation 7800 is associated with the subscriber 100 of FIG. 8 and that subscriber 100 is located on line link frame 00 in horizontal group 0, vertical group 0, and vertical file 0, terminals F800(17), G800(17) and L800(17) will be cross connected to the translator terminals of FIG. 20 in the following manner: terminal F800(17) will be cross connected to translator terminal FT0(20) and FU0(20) indicating line link frame 00; terminal G800(17) will be cross connected to translator terminals HG0(18) and VG0(18) indicating horizontal group 0 and vertical group 0 respectively; and terminal L800(17) will be cross connected to translator terminal VF0(18) indicating vertical file 0 and to a ringing choice terminal (not shown).

A circuit can now be traced from battery in the marker through equipment (not shown), over conductor 19810, through contact 25 of connector relay MCB(18), over conductor 1802, through contact 1 of relay U0(18), over conductor 1805, through contact 10 of TB80(17) to terminal F800(17) thence over cross-connection wire 203 to terminal FT0(20), through contact 4 of connector relay MCA2(20), over conductor 208, and through the winding of relay FTN0(32) to ground, operating the FTN0(32) relay. Relay FTN0(32) closes, at its contact 2, ground over conductor 3320 to operate the FTT0(48) and FTB0(58) relays. Relays FTT0(48) and FTB0(58) lock through contacts 11 of relay FTT0(48), over conductor 4801, through contact 5 of relay LL1(178) and through marker equipment (not shown) to ground.

At terminal F800(17), battery from the marker as previously traced is extended over cross-connection wire 204 to terminal FU0(20), through contact 4 of connector relay MCA2(20), over conductor 3310 and through the winding of relay FUN0(32) to ground. Relay FUN0(32) operates and extends ground through its contact 2 and over conductor 3310 to operate relay FUT0(49). Relay FUT0(49) locks over its contact 4, conductor 4901 and through contact 7 of relay LL1(178) to ground in a circuit similar to the locking circuit for relay FTT0(48).

Battery is also extended through marker equipment (not shown), over conductor 19811, through contact 26 of number group connector relay MCB(18), over conductor 1803, through contact 2 of relay U0(18), through contact 20 of relay TB80(17) to terminal G800(17). From terminal G800(17) battery is extended over cross-connection wires 205 and 206 to translation terminals HG0(18) and VG0(18), through contacts 1 and 11 of the number group connector relay MCB(18), over conductors 209 and 210, through the windings of relay HGN0(28) and VGN0(28) to ground operating these relays. The HGN0(28) and VGN0(28) each extended ground to operate corresponding HGT0(29) and VGT0(26) relays which operate and lock over contacts 9 and 8 of the LT1(178) relay in an obvious circuit.

A circuit is also extended from battery in the marker through equipment (not shown) over conductor 19812, through contact 27 of connector relay MCB(18), over conductor 1804, through contact 3 of relay U0(18), through contact 30 of relay TB80(17), to terminal L800(17), thence over cross-connection wire 207, to translator terminal VF0(18), through contact 32 of connector relay MCB(18) and through the winding of relay VFN0(28) to ground. Relay VFN0(28) operates extending ground through its contact 2 and over conductor 3202 to operate the VFT0(31) relay which locks through its own contact 6, over conductor 3101, through marker equipment (not shown), over conductor 3103 and through contact 10 of relay LL1(178) and marker equipment (not shown) to ground.

The called subscriber line location has now been registered on the appropriate line link frame tens and units, horizontal group, vertical group, and vertical file registration relays.

*Release of number group circuit*

When the line link frame location has been registered on the proper registration relays, a marker check is made to ascertain if these registration relays have been properly operated and locked. If a satisfactory check is made, relay equipment in the marker (not shown) operates to open start lead 17606 to release the number group circuit.

When start lead 17606 in FIG. 19 is opened, the marker preference MP1(25) relay in FIG. 20 releases thereby releasing the MCA1(17), the MCA2(20) and the MCB(18) multicontact relays of the number group connector circuit.

With all of the number group multicontact connector relays released, the previously traced operating circuits for the HB8(17), TB80(17) and U0(18) relays in the number group and the FTN0(32), FUN0(32), HGN0(28), VGN0(28) and VFN0(28) relays in the marker are opened releasing all of these relays.

The number group circuit is now restored to normal and can be used for the subsequent translation of numbers by other markers.

*Seizure of the line link frame of the called line*

After the location of the called line has been registered in the marker, the marker will seize control of the proper line link frame and establish connection to it through an associated line link connector.

FIG. 12 shows the arrangement of the line link connectors 00 and 01 associated with line link frames 00 and 01 for markers 1 and 2.

Each marker has associated with it a preference relay and a plurality of multicontact connector relays for each line link frame connector.

For instance, marker 1, which is being used on the call described herein, has associated with it marker preference relay MP1(9) and connector relays MCA11(6), MCA21(6), and MCB1(2) for line link connector 00 and marker preference relay MP12 and connector relay MCA32 (the other connector relays not being shown) for line link connector 01.

Similarly, marker 2 has associated with it relays MP2(9) and MCA12(10) for line link connector 00, and MP22 and MCA42 for line link connector 01.

When any preference relay in a particular connector operates, it opens the operating circuits for the preference relays of the less preferred markers associated with the higher preferred markers and the operating circuits for the connector relays in that connector, thereby preventing two markers from simultaneously being connected to the same line link frame.

Since the called line was assumed to be located at line link frame 00, battery in FIG. 11 is connected to the start lead ST0 for line link frame 00 over marker equipment (now shown), over conductor 17603, through contact 6 of relay LLC1(96), over conductor 9604, through contact 1 of TFK3(117), thence over conductor 11701, through contact 8 of FUT0(49), over conductor 4904, through contact 1 of FTT0(48), over conductor 4803 in cable "T" to FIG. 12, through marker connector control equipment (not shown), through the winding of MP1(9), through contact 3 of marker preference relay MP2(9) for marker 2 and to ground, assuming that other MP- marker preference relays (not shown) associated with the other markers are released. Relay MP1(9) operates in this circuit and connects ground through its contact 2, over conductor 900 through contact 1 of relay STPLL1, and through the winding of relay MCA11(6) to battery operating the latter relay. Relay MCA11(6) closes circuits from ground through the windings of multicontact relays MCB1(2) and MCA21(6), over contacts 29 and 30 of relay MCA11(6), over conductors 602 and 603, cable "T" to FIG. 11, through contacts 9 and 8 of relay LLC1(96) to battery in the marker thereby operating the MCB1(2) and MCA21(6) relays of FIG. 12.

The operation of multicontact relays MCA11(6), MCA21(6) and MCB1(2) extends a large number of circuits from line link frame 00 (FIGS. 7 and 8) to marker 1 (FIGS. 11 and 15) which are required for testing and establishing a connection from the called line over a channel to the incoming trunk.

As soon as relay MCA11(6) operates it closes a circuit from ground on its contact 26, over conductor 605 in cable "T" to FIG. 11 and through the winding of relay LFK(111) to battery. Relay LFK(111) in FIG. 11 operates indicating that the marker has successfully seized control of the line link frame.

An additional circuit from ground through contact 32 of MCA11(6), over conductor 120 in cable "T" to FIG. 11 and through the winding of relay PRLL1 to battery is closed, and the PRLL1 relay operates indicating that line link frame 00 is "mated" with another line link frame and, if all channels serving line link frame 00 are busy, the channels serving the mate frame can be made available.

With relay HGT0(29) operated, as a result of prior number group translation, a path is closed from battery in FIG. 15, through contact 7 of relay LLC1(96), over conductor 9605, through marker equipment (not shown), over conductor 4408, through contact 5 of HGT0(29), thence over conductor 2901 in cable "R" to FIG. 12, through contact 15 of relay MCA11(6), over conductor 606 in cable "P" to FIG. 8 and through the winding of the corresponding one of the ten horizontal group relays to ground, namely relay HG0(5). Relay HG0(5) in FIG. 8 operates in this circuit to prepare circuits for testing the line links, for operating the select magnets and for operating the appropriate line group relay on the line link frame. As an indication to the marker that the horizontal group relay is operated, relay HG0(5) closes a circuit from ground, through its contact 42, over conductor 502 in cable "P" to FIG. 12, through contact 28 of relay MCA11(6), over conductor 607 in cable "R" to FIG. 15 and through the winding of relay HGK(76) in the marker to battery on conductor 7602. Relay HGK(76) operates in this circuit.

With relay VGT0(26) operated, a circuit is closed from battery in FIG. 15, through equipment (not shown), over conductor 4310, through contact 8 of relay VGT0(26), over conductor 2630 in cable "R" to FIG. 12 through contact 1 of relay MCA11(6), thence over conductor 608 in cable "P" to FIG. 8 and through the winding of relay VGB0(2) to ground operating the VGB0(2) relay in FIG. 8.

The operation of one vertical group (VGB-) relay and one horizontal group (HG-) relay in the line link frame will identify the line group of five lines within which the called line is located. With VGB0(2) and relay HG0(5) operated a circuit is closed for operating the line group relay individual to the line group of the called line. This circuit can be traced from ground through the winding of line group relay LG0(6) in FIG. 8, over conductor 604, through contact 3 of relay HG0(5), over conductor 503, through contact 1 of VGB0(2), over conductor 205 in cable "P" to FIG. 12, through contact 25 of relay MCA11(6), thence over conductor 609 in cable "R" to FIG. 15, through contact 10 of relay LLC1(96), over conductor 9606, through contact 1 of relay HGK(76) and over conductor 7603 through marker equipment (not shown) to battery.

*Selection of a connecting path or channel*

Having obtained access to the incoming trunk through the trunk link frame connector and the called line through the line link frame connector, the marker can now proceed to select an idle connecting path or channel by which the called line may be connected to the incoming trunk. In the selection of such a channel the marker performs the following functions: selects the ten line links by which the called line may be extended; selects ten trunk links having access to the incoming trunk; selects a group of junctors by which the selected line links and the selected trunk links may be interconnected and tests for an idle channel comprising an idle line link, an idle junctor and an idle trunk link of the corresponding selected group.

The number of junctors connecting a particular line link frame with a particular trunk link frame will vary in accordance with the size of the orifice as determined by the number of line link and trunk link frames. In the system disclosed herein there are twenty line link frames and ten trunk link frames. Since there are 100 junctors outgoing from each line link frame (as determined by the size and quantity of line-junctor switches provided on each frame) and these junctors are spread evenly over all trunk link frames, the number of junctors in a subgroup connecting a particular line link frame with a particular trunk link frame will be ten in number.

Where the number of trunk link frames exceeds ten and the number of line link frames exceeds twenty, extension switches are provided and connected in parallel with the trunk-junctor switches on the trunk link frames. The extension switches provide terminations for the junctors serving the line link frames in excess of twenty so that in no case will there be less than ten junctors connecting a particular line link frame with a particular trunk link frame and so that all line link frames will have access to all trunk link frames.

Within a junctor subgroup containing ten junctors, such as in the arrangement described herein, there will be one junctor connecting a vertical termination on each line-junctor switch to a horizontal termination of the like numbered trunk-junctor switch. The junctors constituting a subgroup would be connected to either of the right or left-section of the trunk-junctor switches depending on whether the line link frame is an odd or even-numbered frame.

To determine if a particular channel through which the called subscriber is to be interconnected with the incoming trunk is available for use, it is necessary to test the particular line link, junctor and trunk link associated with this channel for an idle condition. If any one of these elements is busy the entire channel is unavailable.

In this embodiment, the marker is equipped to simultaneously test ten separate channels between a particular subscriber and a trunk. To do this, the marker will test the line link, the junctor and the trunk link associated with each of the channels, but before it is possible for the marker to accomplish this testing, the marker must ascertain which ten channels should be selected and must then determine the elements associated with these ten channels.

The group of line links associated with the ten channels to be tested is determined by the location of the called subscriber, namely the ten line links which terminate in the same horizontal group line switch on the line link frame of the called line. When relay HG0(5) was operated test circuits were extended to the marker for each of the line links to be tested. The test circuit for line link 0 may be traced from the sleeve conductor of line link 0, namely conductor 510 in FIG. 8, over contact 10 of relay HG0(5) in FIG. 7, through a contact of jack JS0(5), over conductor 520 in cable "Q" to FIG. 12, through contact 21 of relay MCA21(6), over conductor 620 in cable "R" to FIG. 15, through contact 6 of channel relay CH0(67), over conductor 6710, through marker equipment (not shown), thence over conductor 6810, through the winding of line link test relay TLL0(82) to battery on conductor 19701. A similar test circuit for line link 9 can be traced from the sleeve conductor 519 of line link 9 in FIG. 7, through contact 1 of relay HG0(5), through a contact of jack JS9(5), over conductor 529 in cable "Q" to FIG. 12, through contact 30 of relay MCA21(6), over conductor 629 in cable "R" to FIG. 15, through contact 6 of channel relay CH9(83), over conductor 8319, through marker equipment (not shown), over conductor 6819 and through the winding of line link test relay TLL9(82) to battery on conductor 19701. Similar test circuits are closed for the other 8 line links but are not shown. When a line link is busy its sleeve conductor will be marked with ground, and the corresponding line link test relay will be operated.

When the trunk link frame is connected to the marker circuit, the selection of the subgroup of junctors and the identification of the office size will be initiated.

If junctor extension switches are provided the trunk link frames are arranged in pairs and the junctor distribution differs somewhat to that used with nonpaired frames. The invention herein, is disclosed in a nonpaired trunk link frame office; however, it wil be readily seen that the invention is applicable to other size offices having different junctor arrangements.

In the trunk link frame, cross connecting terminals are provided to indicate whether or not the trunk link frame is paired. Since it has been assumed that this is a single trunk link frame office, terminal STF(102) will be cross connected to ground, as shown in FIG. 10, completing a circuit over conductor 100 and through contact 24 of relay MCC(102) in FIG. 11, over conductor 10201 and through the winding of relay STF(75) to battery. In addition a cross connecting wire is connected to terminal SZA(102) extending ground over conductor 101 to FIG. 11, through contact 42 of relay MCC(102), over conductor 10202, through the winding of relay 10TLF(79) to battery. Relay 10TLF(79) operates indicating that this is a ten trunk link frame office. As an auxiliary indication of the number of line link frames, relay 20F(74) of FIG. 16 will be operated in a circuit traced from battery through its winding, over conductor 7400, through contact 2 of relay STF(75), over conductor 7500 and through contact 4 of relay 10TLF(79) to ground. Relay 20F(74) indicates that there are 20 or less line link frames in the office.

In the present disclosure, having 20 line link frames and 10 trunk link frames, there are no junctor patterns required, and the junctor pattern normal relay PNR(65) of FIG. 16 is operated. The operating circuit for the PNR(65) relay can be traced from battery through marker equipment (not shown), over conductor 17400, through the winding of the PNR(65) relay, over conductor 6500, through contact 3 of relay STP1(79), through contact 5 of relay 10TLF(79) and over conductor 7900 to ground.

With relay PNR(65) operated, ground is connected over ten of its contacts, through the windings of ten test channel relays TCH0(81) to TCH9(81) to battery operating all of the test channel relays. Each of these TCH- relays, of which only TCH0(81), TCH4(81), TCH-5(81) and TCH9(81) are shown in FIG. 11, connects ground over its contact 1 to conductor 8100 in FIG. 16 and through the winding of test channel check, TCHK-(76), relay to battery. Relay TCHK(76) operates in this circuit to indicate that the junctor subgroup has been selected and the corresponding pattern identified.

Each of the relays TCH0(81) to TCH9(81) at its contact 2, closes a link in the selecting circuit of FIG. 16 for the associated channel. For patterns other than a normal pattern, only those TCH- relays associated with the channels for which junctors are available will be operated, and the nonoperation of a TCH- relay marks the corresponding channels as unavailable.

With the STP1(79) and the 10TLF(79) relays operated, a circuit is closed for operating one of the junctor subgroup (JG-) relays. This circuit can be traced in FIG. 16 from ground in the marker, over conductor 7900, through contact 1 of relay 10TLF(79), through contact 4 of relay STP1(79), over conductor 7501 and through the winding of the JGO(75) relay to battery, causing the JG0(75) relay to operate.

After the office size and the junctor subgroup have been identified, the marker circuit will operate a relay in the trunk link frame to extend the junctor test leads from the trunk link frame to the marker. The marker must also determine whether the selected junctors terminate on the left-section or right-section of the trunk-junctor switch and determine the horizontal level on each trunk-junctor switch on which the selected junctors terminate.

With relays JG0(75) and FUT0(49) operated a circuit is closed from ground through the winding of the left relay, L(54) in FIG. 10, over conductor 5403 to FIG. 11, through contact 20 of relay MCC(102), over conductor 10203, through contact 6 of relay JG0(75), over conductor 7502, through contact 7 of FUT0(49), over conductor 4902 and through equipment (not shown) in the marker to battery. Relay L(54) operates in this circuit and closes a circuit from ground over its contact 11, over conductor 5404 in cable "S" to FIG. 15, through contact 44 of relay MCC(102), over conductor 10204 and through the winding of relay LK(76) to battery, operating the LK(76) relay as an indication to the marker that the L(54) relay on the trunk link frame has operated.

With relay JG0(75) operated a circuit is also closed for operating relay G0(119) from ground through the winding of relay G0(119) in FIG. 10, over conductor 11900 to FIG. 11, through contact 26 of relay MCC(102), over conductor 10205, through contact 8 of relay JG0(75), thence over conductor 7503 and through equipment in the marker (not shown) to battery.

The marker is now ready to operate a junctor connector relay for connecting the junctor test conductors and the operating circuits for the junctor select magnets to the marker. The circuit for the junctor connector relay JC0(53) in FIG. 10 which is individual to the group of junctors which has been selected by the foregoing operations, may be traced from ground, through the winding of JC0(53) relay, over conductor 5300, through equipment (not shown), over conductor 14002, through contact 10 of relay G0(119), over conductor 11901 to FIG. 11, through contact 18 of relay MCC(102), over conductor 10207, thence through contact 3 of relay FUT0(49), over conductor 4903, through contact 7 of relay FTB0(58), over conductor 5801, through contact 7 of JG0(75) and over conductor 7505 to battery in the marker.

Relay JC0(53) operates in this circuit and extends test circuits for the selected subgroups of junctors to the marker. The test circuit for junctor 000, which is the zero junctor in the group connecting trunk link frame 00 with line link frame 00, may be traced from junctor sleeve conductor 5301 in FIG. 10, through contact 11 of relay JC0(53), over conductor 5302, through contact 10 of relay L(54), over conductor 5405, through a contact of jack JS0(53), over conductor 5303 to FIG. 11 through contact 25 of relay MCB(86), thence over conductor 8605, through contact 8 of relay CH0(67), over conductor 6720 and through the winding of junctor test relay TJ0(82) to battery on conductor 19701. Similarly, test circuits are closed from the sleeve conductors of the nine other junctors, in the subgroup identified by relay JC0(53), to the windings other TJ- relays of which only relays TJ4(82), TJ5(82) and TJ9(82) are shown.

To indicate that relay JC0(53) has operated, relay JC0(53) closes through circuits for select magnets of the associated junctors to the marker. The circuit for select magnet TJS0(53) associated with junctor 000 may be traced from ground through the winding of select magnet TJS0(53) in FIG. 10, through contact 1 of JC0(53), over conductor 5304 to FIG. 11, through contact 44 of the MCB(86) relay, over conductor 8606, and through the winding of relay JCK0(82) to battery. A similar circuit is extended from the winding of a select magnet on switch 1 (not shown), through contact 10 of JC0(53) and through the winding of relay JCK1(82) in FIG. 11 to ground. Relays JCK0(82) and JCK1(82) operate in the above-described circuits, but are of sufficiently high resistance to prevent the operation of the associated select magnets on the trunk-junctor switches.

The group of ten trunk links associated with the ten channels to be tested terminate on the trunk switch associated with the incoming trunk on either the left-section or the right-section of this switch. If the junctors associated with the selected subgroup terminate on the left-section of the trunk-junctor switch, the ten trunk links associated with the ten selected channels also terminate on the left-section of the trunk switch. Having priorly determined that the selected subgroup of junctors is located on the left-section of the trunk-junctor switch, relay L(54) was operated. It will also be recalled that a sequence of operations including the operation of relays FB2(70) and the level relay LV9(69), in accordance with the location of the incoming trunk on the trunk link frame, caused by the operation of trunk relay LC0(54). With relays LC0(54) and L(54) operated, the sleeve conductors of the ten trunk links are extended to the marker to be tested. The test circuit for trunk link 00-left may be traced from its sleeve conductor 5409 in FIG. 14, through contact 14 of relay LC0(54), through contact 12 of relay L(54), over conductor 5420 in cable "S" to FIG. 15, through contact 24 of relay MCB(86), over conductor 8607, through contact 10 of relay CH0(67), over conductor 6730 and through the winding of trunk link test relay TTL0(82) to battery over conductor 19701. Similar test circuits are closed from each of the remaining nine trunk links to other trunk link test relays TT; however, only relays TTL4(82), TTL5(82) and TTL9(82) are shown in FIG. 15. If any of the trunk links in the group are busy, ground will be connected to the associated sleeve conductor, and the corresponding one of the TTL- relays will be operated.

Test circuits have now been closed for the line links, the junctors and the trunk links for all the channels in the subgroup by which called line may be connected to the incoming trunk. If the line link, the junctor and the trunk link associated with a channel are all idle, the entire channel is available for use, but if either the trunk link, the junctor or the line link is busy, the entire channel is unavailable and considered busy.

Before proceeding with the selection of an idle channel the marker ascertains that the previously described check relays have been properly operated. This circuit may be traced in FIG. 16 from ground over contact 1 of relay JCK1(82), through contact 1 of the JCK0(82) relay, over conductor 8200, through marker equipment (not shown), through contact 4 of relay STP2B, over conductor 9206, through contact 3 of relay LCK(76) and contact 2 of relay HGK(76), through contact 2 of relay TCHK(76), through contact 3 of relay LK(76), through contact 2 of relay RK(76), over conductor 7604, through marker equipment (not shown), thence over conductor 9307, through contact 10 of relay FBK(109), over conductor 10911 to the winding of relay TK(92) and battery. Relay TK(92) operates in this circuit indicating that all of the preliminary operations have been performed and the marker can now test and select an idle channel.

Relay TK(92) in operating closes ground through its contact 10 through channel timing circuit 160 and through the winding of relay CHT(68) to battery. The channel timing circuit 160 delays the operation of the CHT(68) relay allowing such time for all of the line link test relays, junctor test relays and trunk link test relays to operate.

When relay CHT(68) does operate, after the short delay, a circuit is prepared for operating one of the channel relays (CH-) in the channel test circuitry. A ground is extended through contacts of test line link (TLL-), test trunk links (TTL-) and test junctor (TJ-) relays beginning with the preferred channel relay. If any one of the TTL-, TLL- or TJ- relays is operated indicating a busy link and, therefore an unavailable channel, the ground is extended to the next preferred channel relay, and so on, until all channels have been interrogated to ascertain if a channel is available having all three channel components idle.

*All-channel busy condition*

In the Busch Patent 2,585,904 ground was extended through operated TTL-, TLL- and TJ- relays of the busy channels in a similar manner and if all channels were busy the ground completed a circuit for operating a failure-to-match, FMP(128), relay of FIG. 16. This failure to match relay indicated that the marker was unable to match an idle line link, trunk link and junctor for any channel in the selected subgroup and the call could not be completed using that channel subgroup. If no other subgroups were available, a series of marker operations would take place to condition the incoming trunk so that the incoming trunk could return an overflow signal to the distant office.

It will be recalled that when the marker seized line link frame 00, the PRLL1 relay in FIG. 11 operated indicating to the marker that another subgroup of junctors serving a different line link frame could be made available to serve the line link frame containing the called line. After the marker encounters a failure-to-match when testing the channel subgroup serving line link frame 00 and trunk link frame 00 and with the PRLL1 relay operated, the marker will disconnect the channel test circuitry from the trunk links and junctors of the first subgroup serving line link frame 00, seize control of the mate link frame and connect the channel test circuitry to the trunk links and junctors of a second subgroup of channels serving trunk link frame 00 and the "mate" line link frame. An attempt will then be made to set-up an interconnection between the incoming trunk on trunk link frame 00 and the called subscriber 100 on the line link frame 00 by matching an idle trunk link and an idle junctor of the second subgroup, with an idle line link of the first subgroup. If a match is made, the subgroups can be interconnected by using an auxiliary crossbar switch on the auxiliary switch frame of FIGS. 3 and 4.

Figure 3:
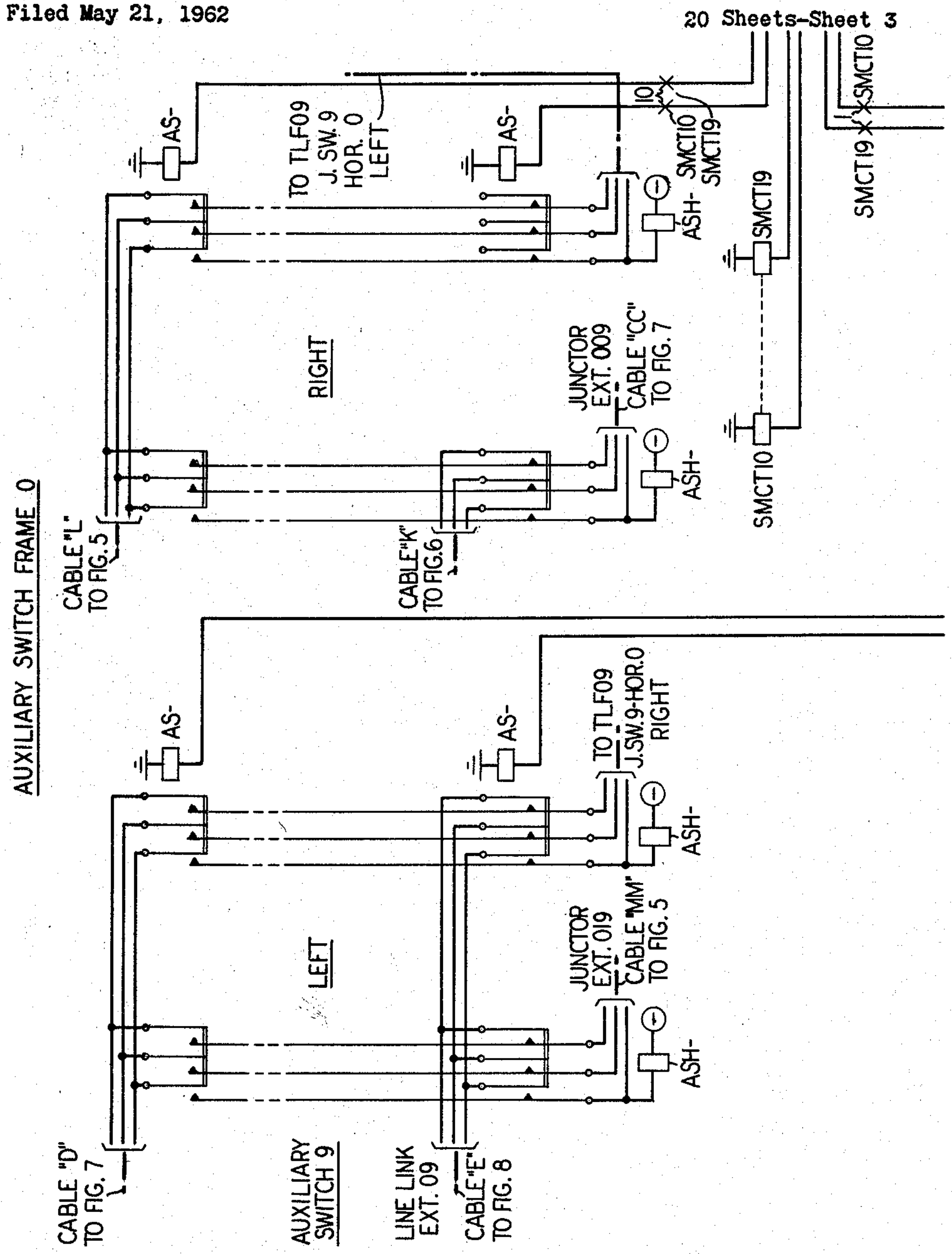
FIGS. 3 and 4 show an auxiliary switch frame used for "mating" two line link frames.
Figure 4:
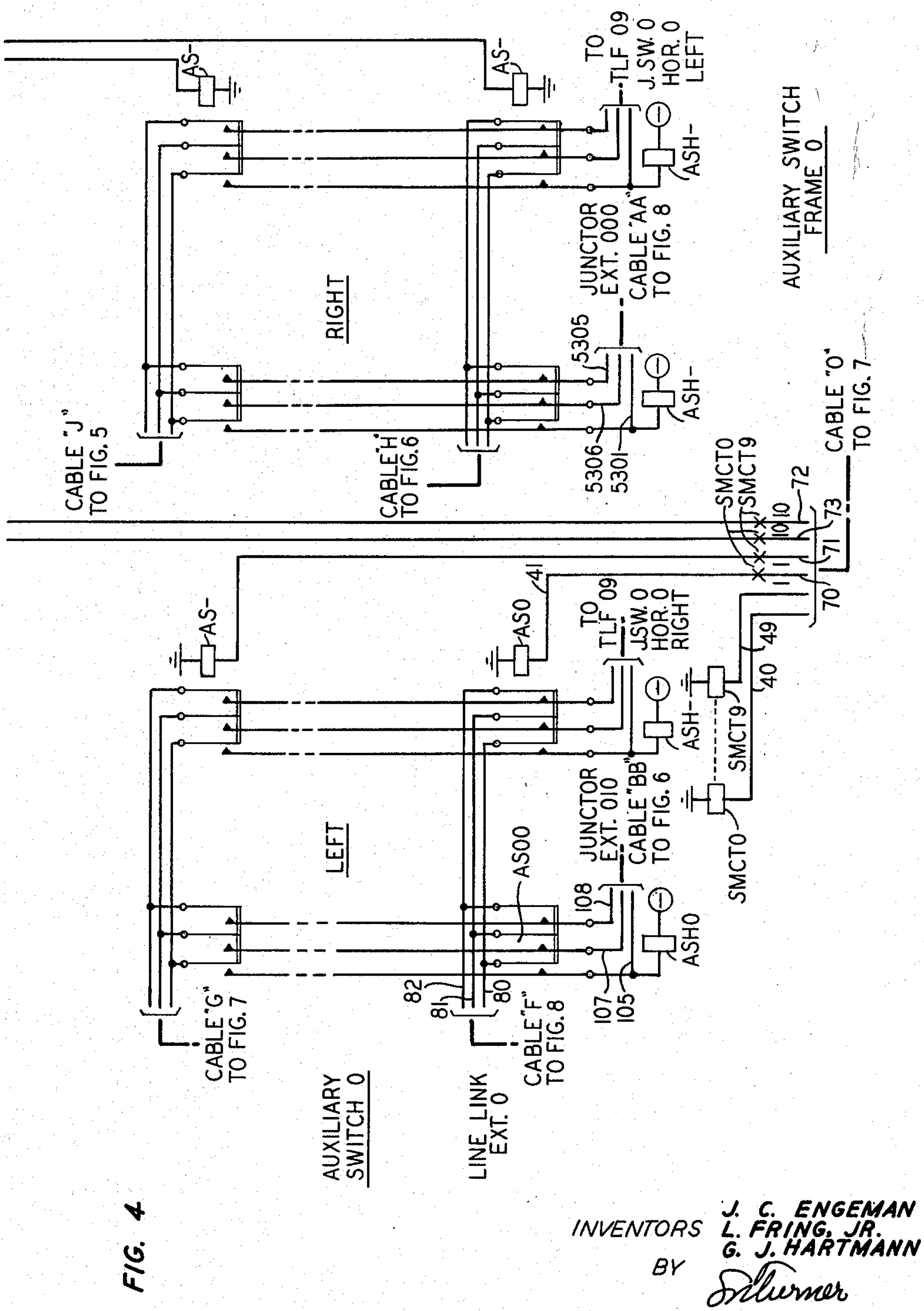
Figure 5:
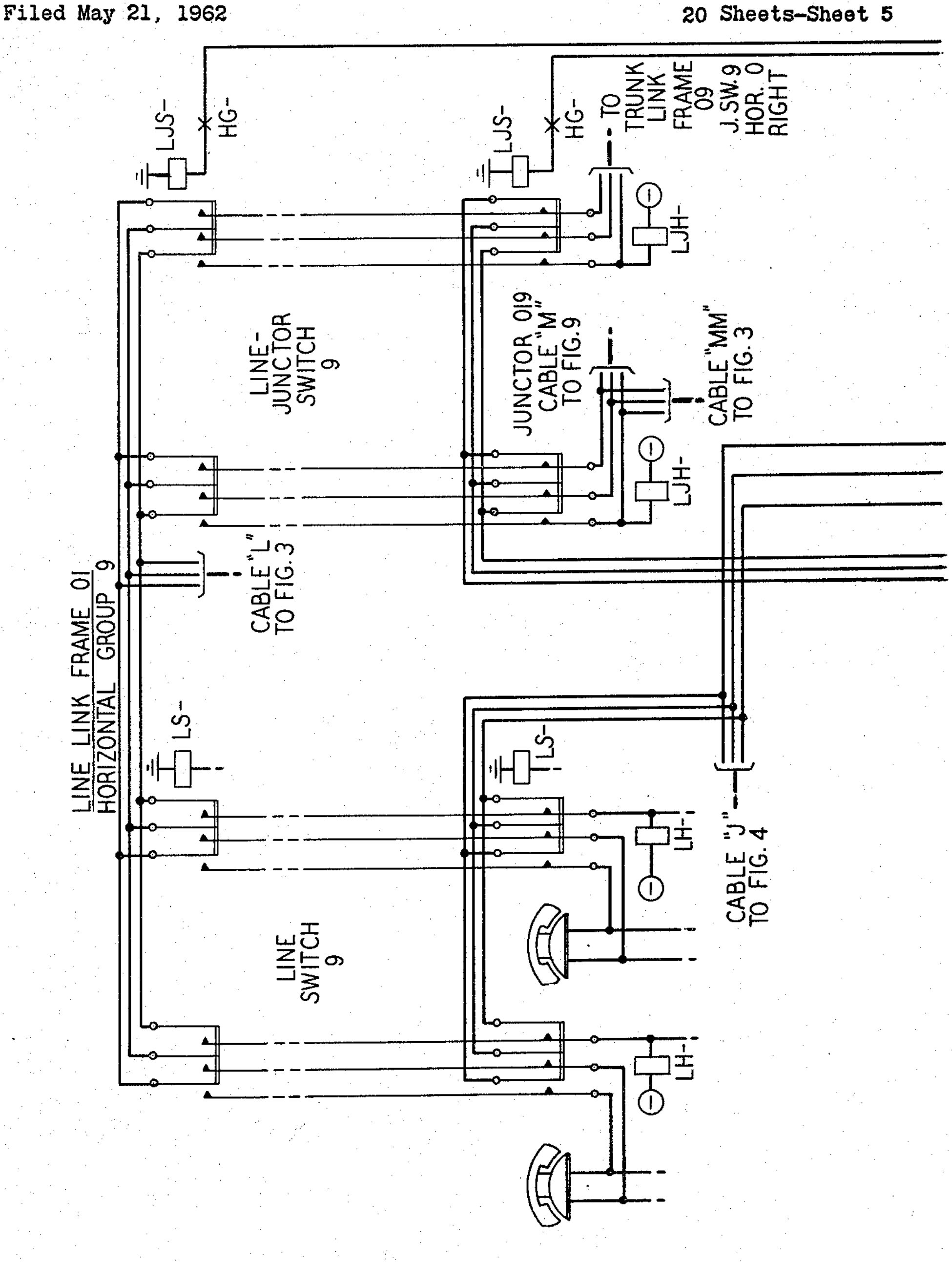
FIGS. 5 and 6 show line link frame 01.

FIGS. 3 and 4 represent auxiliary switch frame 0 which is used to "mate" line link frame 00 and the line link frame 01. In the example described herein, auxiliary switch frame 0 comprises ten horizontal groups (only 0 and 9 are shown) of auxiliary switches each of which is divided into a left and right-section. Each of the horizontals of the left-section switches is connected to extensions of a different line link on the even-numbered line link frame (line link frame 00) so that all of the line links connected to one horizontal group line-junctor switch are extended to the same horizontal group auxiliary switch. The horizontals of the right-section switches are arranged in a similar manner with respect to the line links on the line-junctor switches of the odd-numbered line link frame (line link frame 01).

The verticals of the left-section auxiliary switches are connected to extensions of all of the junctors serving the odd-numbered "mate" frame from all of the trunk link frames. The extensions of these junctors are arranged so that each horizontal group auxiliary switch has connected to it all of the junctors which are connected to the corresponding horizontal group line-junctor switch of the odd-numbered "mate" frame. The verticals of the right-section auxiliary switches are arranged in a similar manner for junctors serving the even-numbered line link frame line-junctor switches.

The auxiliary switch frame also includes select magnet cut-through relays (SMCT-) which control the operating paths for the select magnets on the crossbar switches of the auxiliary switch frame. The SMCT- relays prevent the select magnets on the auxiliary switch frame from operating until the marker, which is attempting to select a channel serving the "mate" frame, seizes control of the "mate" frame and locks-out all other markers that may be attempting to seize that frame. This feature eliminates the possibility of a double connection if two markers are simultaneously completing calls in "mated" frames.

To illustrate how the marker can complete a call using the subgroup of channels serving the mate frame, let it be assumed that all channels in the subgroup interconnecting line link frame 00 and trunk link frame 00 are busy because either the line link, trunk link or junctor of each channel is busy, thereby making the entire channel busy. Let it also be assumed that there are idle line links available for certain channels in this same subgroup, say for instance line link 0 corresponding to channel 0, but that channel 0 is unavailable due to a busy junctor or trunk link.

When relay CHT(68) operates after an appropriate delay to allow for the operation of the TL-, TLL-, and TJ- relays, a circuit in FIG. 16 is closed from ground, through contact 4 of the LLC1(96) relay, over conductor 9602, through contact 4 of relay FMP(128), over conductor 8300, through normally closed contacts 12 of relays CH9(93) to CH0(67), over conductor 10906, through marker equipment not shown, over conductor 6800, through contact 1 of relay CHT(68), over conductor 17401, thence through marker equipment (not shown) over conductor 8101, through contact 2 of relay TCH0(81), through contact 2 of relay TLL0(82) and through contact 1 of relay TTL0(82) or TJ0(82) depending on whether the trunk link or the junctor of channel 0 is busy, thence over conductor 8202, and through similar contacts of the TCH-, TLL-, TTL-, and TJ- relays for channels 1 through 9. Assuming that at least 1 channel component for each of channels 1 through 9 is busy, the appropriate test relay TLL-, TTL-, or TJ- will be operated and the ground as previously traced will be extended to conductor 8203, through marker equipment (not shown), over conductor 6803, through contact 3 of the 10TLF(79), through contact 8 of the INC(153), over conductor 161, through contact 1 of the PRLL1 relay, over conductor 162, through contact 1 of relay STP1(79) and through the winding of the STP(79) relay to battery. Relay STP(79) operates and locks to ground that can be traced through contact 2 of the ONW(111) relay, over conductor 11110 and through contacts 3 of the STP(79) relay.

In operating, the STP(79) relay opens, at its contact 2, the operating circuit for the STP1(79) relay. The STP1(79) relay releases and opens the operating circuit for the PNR(65) relay of FIG. 16 releasing the latter relay. The PNR relay releases the TCH0(81) to TCH9(81) relays, and when all the TCH- relays in FIG. 11 have released, the operating circuit for the TCHK(76) relay in FIG. 16 is opened and the TCHK(76) relay releases.

When relay STP1(79) releases it also opened at its contact 4 the operating circuit for the JG0(75) relay in FIG. 16. The JG0(75) relay, in releasing, causes the following operations: (1) opens, at its contact 7, the operating circuit for the junctor connector relay JC0(53); (2) opens, at its contact 8 in FIG. 11, the operating circuit for G0(119); and (3) opens, at its contact 6 in FIG. 11, the operating circuit for left relay L(54) thereby releasing each of these relays. The JC0(53) relay in releasing disconnects the ten test junctor relays TJ0(82) to TJ9(82) from the sleeves of the junctors 000 to 009 in the first channel subgroup. In addition, relay JC0(53) opens, at its contacts 1 and 10, the operating circuits for the junctor connector check relays JCK0(82) and JCK1(82).

When relay L(54) releases it opens the operating circuit, at its contact 11, for the left check relay LK(76). In addition, relay L in releasing disconnects the ten test trunk link relays, TTL0(82) to TTL9(82) from the sleeve of the ten trunk links 00 left to 09 left.

The release of any one of the LK(76), TCHK(76), JCK0(82) and JCK1(82) releases the TK(92) relay which, in turn, releases the CHT(68) relay.

When all of the above mentioned check relays have released, a circuit is closed for operating the STP2(79) and the STP2B relays. This circuit can be traced from battery through the windings of the STP2(79) and the STP2B relays in parallel, through contact 1 of relay STP(79), through contacts 4 of the RK(76) and the LK(76) relays through contact 3 of the TCHK(76) relay, through contact 2 of the LCK(76) relay, over conductor 7605 and through contacts 2 of the JCK1(82) and the JCK0(82) relays to ground.

*Selection of channel subgroup serving the "mate" frame*

With the STP2(79) and the STP2B relays operated the marker is prepared for testing the subgroup of channels serving trunk link frame 00 and the "mate" line link frame 01. Relay STP2(79) at its contact 2 completes a circuit for operating relay JG1(75) in FIG. 16. This circuit can be traced from ground over conductor 7900, through contact 1 of relay 10TLF(79), through contact 2 of the STP2(79) and through the winding of JG1(75) to battery. Relay JG1(75) in operating closes, at its contact 4, a circuit from battery on conductor 7503 in FIG. 11 of the marker, over conductor 110, through contact 27 of relay MCC(102), over conductor 102 to FIG. 10 and through the winding of relay G1(119) to operate relay G1(119). With relays G1(119) and and JG1(75) operated a circuit is completed for reoperating junctor connector relay JC0(53) of FIG. 10. This circuit can be traced from battery in the marker, through equipment (not shown), over conductor 7505, through contact 8 of relay JG1(75), through contact 1 of relay 20F(74), over conductor 5800, through contact 7 of relay FTB0(58), over conductor 4903, through contact 3 of FUT0(49), over conductor 10207, through contact 18 of relay MCC(102), over conductor 11901 to FIG. 10, through contact 10 of relay G1(119), through cross connecting wire 103, over conductor 14002, through equipment (not shown), over conductor 5300 and through the winding of the JC0(53) relay to ground.

Relay JC0(53) in operating, closes through the previously traced operating circuits for relays JCK0 (82) and JCK1(82) in FIG. 11 of the marker.

Relay JG1(75) also completes an operating circuit for right relay, R(54), to indicate to the marker that the trunk links in the subgroup serving line link frame 01 are on the right halves of the trunk and trunk-junctor switches. This circuit can be traced from ground, through the winding of the R(54) relay in FIG. 10, over conductor 104 to FIG. 11, through contact 22 of the MCC(102), over conductor 111, through contact 6 of the JG1(75) relay, through contact 7 of the FUT0(49) relay, over conductor 4902 and through marker equipment (not shown) to battery. The R(54) relay in operating closes a circuit from ground, through its contact 21, over conductor 143 in cable "S" to FIG. 15, through contact 43 of relay MCC(102), over conductor 152 and through the winding of the RK(76) relay to battery operating the RK(76) relay as an indication that the R(54) relay has operated.

With the (R54), G1(119) and the JC0(53) relays operated the test junctor (TJ-) and the test trunk link (TTL-) relays are connected to the respective junctors and trunk links of the channel subgroup serving line link frame 01 in a manner similar to their prior connection to the subgroups serving line link frame 00.

For instance, the TJ0(82) to TJ9(82) are connected to the sleeves of junctors 010 to 019, respectively. The circuit for the TJ0(82) can be traced over the previously traced path from the winding of the TJ0(82) relay in FIG. 11 to conductor 5405 of FIG. 10, thence over conductor 106, through contact 1 of relay R(54), through contact 10 of relay JC0(53) and to the sleeve conductor 105 of junctor 010. Circuits for relays TJ4(82), TJ5(82) and TJ9(82) are closed through to the sleeves of the respective junctors in a similar manner.

For the purpose of this description it will be assumed that junctor 010 is idle and, therefore, no ground is present on sleeve conductor 105 to operate the TJ0(82) relay.

Further, the TTL0(82) to TTL9(82) relays are connected to the ten sleeve conductors of trunk links 00-right to 09-right. The circuit for the test trunk link relay TTLO(82) can be traced over the previously traced path from its winding in FIG. 15, to conductor 5420 in FIG. 14, thence over conductor 144, through contact 11 of relay R(54), contact 22 of relay LC0(54) and to sleeve conductor 145 of trunk link 00-right. It will be assumed that trunk link 00-right is also idle and, therefore, relay TJ0(82) is not operated.

When relay STP2(79) operated, a circuit was also closed from ground in FIG. 16 through contact 5 of the 10TLF relay, through contact 3 of the STP2(79) relay, over conductor 6500 and through the winding of relay PNR(65) to battery on conductor 17400 thereby reoperating the PNR(65) relay. Relay PNR, in operating, closes through the previously traced operating circuit for the TCH0(81) to TCH9(81) relays of FIG. 11. All of the TCH- relays reoperate completing a circuit for reoperating the TCHK(76) as previously described.

The marker has now prepared the channel test circuitry for testing a second subgroup of junctors and trunk links serving trunk link frame 00 and line link frame 01 along with the previously tested line links on line link frame 00.

Before the marker can test this subgroup it must seize control of line link frame 01 and lock out all other markers from this frame to prevent a double connection if another marker is simultaneously trying to complete a call in the "mate" line link frame 01.

*Seizure of the mate line link frame*

When relay STP2B operates subsequent to the release of the aforementioned check relays thereby indicating that the channel test circuitry has been disconnected from the junctors and trunk links of the channel subgroup serving line link frame 00, the marker is ready to seize control of the "mate" line frame 01.

In FIG. 11 there is shown a typical arrangement of the contacts of the line link frame tens and units registration relays for the start lead circuits of line link frames 00 to 19. The combination of a line link frame tens relay (FTT-) and a line link frame units relay (FUT-) will close a circuit from battery in the marker to the marker preference relays in the connector associated with the line link frame having that tens and units designation. With the STP2B relay operated, start leads for the two frames that are "mated" are bridged so that the marker can extend the same start battery to the "mate" frame line link connector and thereby seize control of the "mate" frame and hold it busy while a subgroup of junctors serving the "mate" frame is tested.

Of course, it will be realized that it is not necessary to "mate" all of the line link frames in an office, and if it is desirable not to mate certain frames, those frames will not have their start leads bridged. In addition, ground will be removed from contact 32 of the corresponding MCA-connector relay eliminating the operation of the marker PRLL-relay which indicates "mated" line link frames.

With relay STP2B operated, battery as previously traced over conductor 4904 in FIG. 11 is extended through contact 1 of the STP2B relay, through contact 9 of the FUT0(49) relay, through contact 2 of the FTT0(48) relay, over start lead conductor 121 in cable "V" to FIG. 12 through contacts of marker preference relays (not shown), through the winding of marker preference relay MP12, through contact 1 of the MP22 relay, through marker preference relay contacts (not shown) to ground operating the MP12 relay in FIG. 12. Relay MP12 opens start lead 122 in FIG. 12 thereby preventing marker 2 from seizing control of line link frame 01 while marker 1 is attempting to complete the present call.

In FIG. 12 there is also depicted the LFK2–O and LFK2–E relays for marker 2 and the STPLL2 relay common to marker 2 and line link connectors 00 and 01. Although the operation of marker 2 and these relays will not be described in detail, the functions of these relays associated with marker 2 will become apparent from the description of the comparable relays (LFK1–O, LFK1–E, and STPLL1) associated with marker 1.

When the marker preference relay MP12 operates under the normal seizure of a line link frame, it closes circuits to operate a plurality of multicontact relays, such as MCA32, thereby extending numerous test and control leads from line link frame 01 to marker 1. However, when relay STP2B in FIG. 16 operated indicating that the "mate" frame is to be seized only to permit channel test of the junctors serving the "mate" frame, is closed through a circuit from ground, in FIG. 11 through contact 3 of the STP2B relay over conductor 123 in cable "T" to FIG. 12 and through the winding of the STPLL1 relay to battery operating the STPLL1 relay. The STPLL1 relay is common to line link connectors 00 and 01 for marker 1 and at its contact 3, opens the operating circuit for multicontact relay MCA32 which is associated with the line link connector for line link frame 01 and marker 1. The ground that would normally operate the MCA32 relay is extended back over contacts of the STPLL1 to FIG. 11 of the marker to operate a line link frame check "odd" (LFK1–O) relay. This circuit can be traced from ground, through contacts of marker preference relays (not shown), through contact 2 of the MP12 relay, through contact 4 of the STPLL1 relay, over conductor 124 in cable "V" to FIG. 11 and through the winding of LFK1–O relay to battery operating the LFK1–O relay.

In line link connector 00 a similar circuit is extended from conductor 900, through contact 2 of the STPLL1 relay, over conductor 125 in cable "T" to FIG. 11 and through the winding of the LFK1–E relay in FIG. 11 to battery operating the LFK1–E "even" check relay. Relay MCA11(6) in FIG. 12 remains operated through its contact 31 which bypasses the open contact of the STPLL1 relay.

The operation of both "odd" and "even" line link frame check relays, LFK1–O and LFK1–E in FIG. 11, indicates that the marker has maintained control of the first line link frame, seized control of the "mate" line link frame and can now proceed with the selection of an idle channel in the subgroup serving the "mate" frame. Furthermore, the LFK1–O and LFK1–E relays complete a circuit for the operation of one of the select magnet cut-through (SMCT-) relays which in turn prepares the operating circuits for the select magnets on the auxiliary switch frame. The operating circuit for relay SMCT0, associated with the line switch of horizontal group 0 on line link frame 00, can be traced from ground, through the winding of the SMCT0 relay in FIG. 4, over conductor 40 in cable "O" to FIG. 7, through contact 53 of the HG0(5) relay, over conductor 60 in cable "Q" to FIG. 12, through the contact 33 of relay MCA11(6), over conductor 125 in cable "R" to FIG. 15 and through contacts 1 of the LFK1–O and the LFK1–E relays to battery.

*Selection of an idle channel via the auxiliary switch frame*

It will be remembered that when the STP2(79) and the STP2B relays operated, the JG1(75) the G1(119) and the R(54) relays operated to connect the channel test circuitry to the sleeves of the ten right-section trunk links and the ten junctors (010 to 019) serving line link frame 01. The marker can now proceed to ascertain if there is an idle channel comprising (1) an idle trunk link in the group 00-right to 09-right; (2) an idle junctor in the subgroups 010 to 019 serving line link frame 01 and also connected to vertical 0 on each of the horizontal group left-section auxiliary switches of the auxiliary switch frame; and (3) an idle line link in the group 0 to 9 serving the line switch in horizontal group 0 of line link frame 00 and also connected to horizontal 0 of each of the left-section horizontal group auxiliary switches.

When all of the aforementioned check relays such as relays RK(76), JCK0(82) etc., have operated, a circuit is completed for reoperating the total check, TK(92), relay in FIG. 16. This circuit can be traced from battery, through the winding of the TK(92) relay, over conductor 10911, through contact 10 of the FBK(109), over conductor 9307, through equipment (not shown) and over conductor 7604, through contact 3 of the RK(76) relay, through contact 2 of the LK(76) relay, through contacts 2 of the TCHK(76) and the HGK(76) relays, thence through contact 5 of the LCK(76), through contacts 2 of the LFK1–O and LFK1–E relays, through contact 3 of the STP2B relay, through marker equipment (not shown), over conductor 8200, and through contacts 1 of the JCK0(82) and the JCK1(82) relays to ground. The TK(92) relay operates and, as before, reoperates the CHT(68) relay after a short delay allowing time for the operation of the TLL-, TJ-, and TTL- relays.

Figure 6:
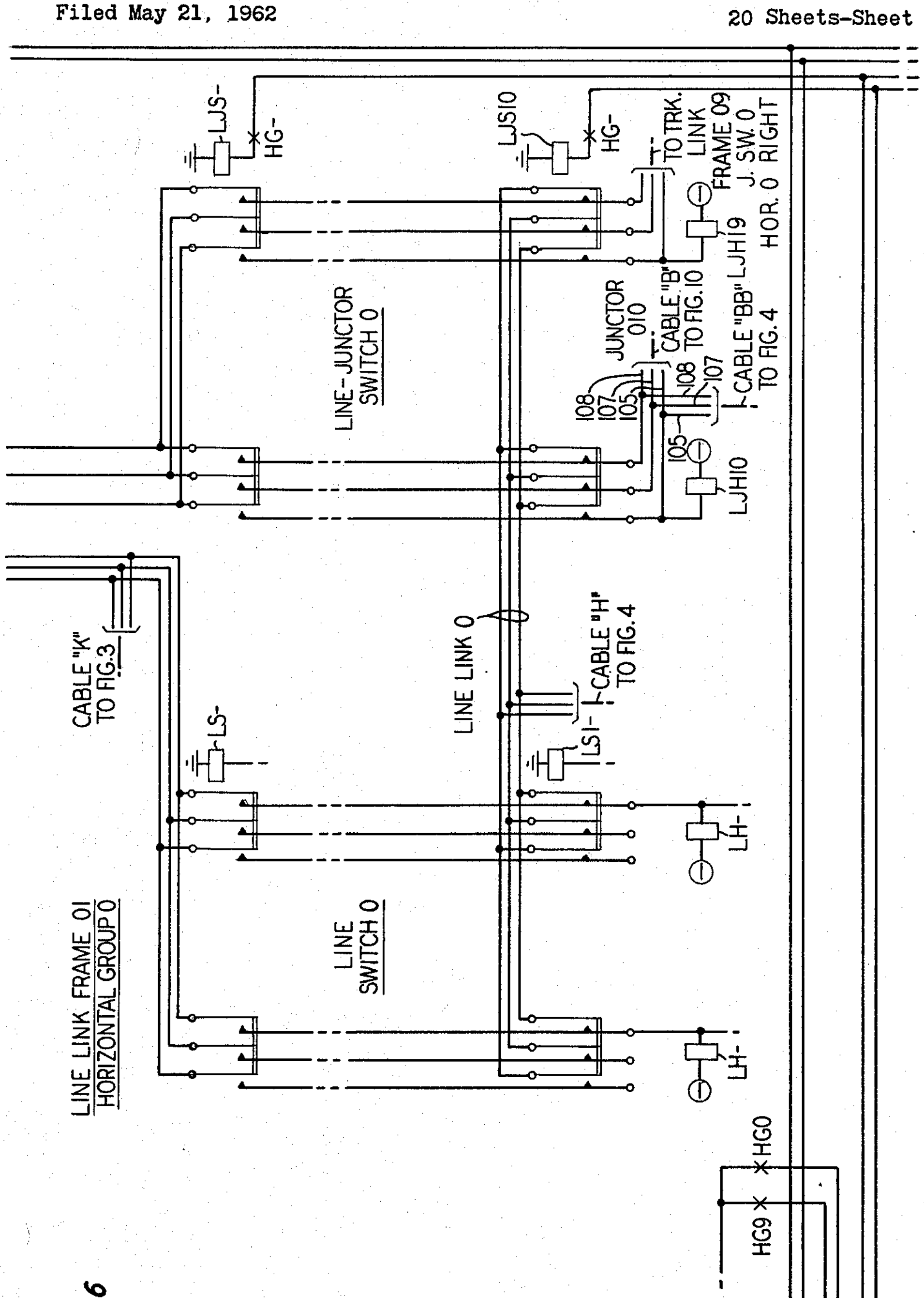

Let it be assumed that trunk link 00-right in FIGS. 10 and 14 and junctor 010, connected to the "mate" line link frame 01 by cable "B" in FIG. 6 and to auxiliary switch 0 in the left-section by cable "BB" in FIG. 4 are idle and that line link 0 in FIG. 8 on line link frame 00 and also connected by cable "F" to auxiliary switch 0 in FIG. 4, is idle.

Under this assumption the TJ0(82) relay in FIG. 11 and the TLL0(82) and TTL0(82) relays in FIG. 15 would not be operated indicating that the idle channel components of channel 0 can be matched successfully for interconnecting the incoming trunk with the called subscriber 100.

Ground is extended, as previously traced from contact 4 (FIG. 16) of relay LLC1(96), through the normal contacts 12 of all of the CH- relays, over conductor 6800, through contact 1 of relay CHT(68), over conductor 17401, through equipment (not shown), over conductor 8101, through contacts 2 of relays TCH0(81), TLL0(82), TTL0(82) and TJ0(82), over conductor 6700, through the winding of relay CH0(67), thence over conductor 8301, through the winding of the CHA(109) relay to battery, operating the CH0(67) and the CHA(109) relays. The CH0(67) and CHA(109) relays lock in series from ground over the previously traced operating circuit from conductor 8300 and through contact 13 of the CH0(67) relay.

*The operation of the selected channel*

It will be remembered that the select magnets TS90(54) and B(54) on the trunk switch were previously operated by the FB2(70) relay in preparation for connecting the incoming trunk with an idle trunk link.

When the CH0(67) relay operates, it closes through operating paths for select magnets on the line switch, line-junctor switch, auxiliary switch and the trunk-junctor switch.

The operating paths for the line switch select magnet, LS0(5), the line-junctor select magnet, LJS0(5), and the auxiliary switch select magnet, AS0, can be traced from battery in FIG. 15 through marker equipment (not shown), through contact 3 of relay CH0(67), over conductor 6750 in cable "R" to FIG. 12, through contact 11 of MCA21(6) and over conductor 640 in cable "P" to FIG. 8. From conductor 640 in FIG. 8, this ground is extended through contact 40 of relay HG0(5) and through the winding of the line select magnet LS0(5) to ground operating the LS0(5) magnet. This prepares the subscriber line for interconnection with the idle line link extension connected to auxiliary switch frame 0.

The battery on conductor 640 is also extended through contact 30 of relay HG0(5) to the winding of select magnet LJS0(5) on line-junctor switch 0 of FIG. 8. The LJS0 select magnet operates; however, no crosspoints will be closed at this switch since junctor 000 was assumed to be busy and its corresponding hold magnet, LJH0(5), will have already been operated on another call. In addition, the same battery that was extended through contact 30 of the HG0(5) relay is extended over conductor 83 to FIG. 7, over conductor 70 in cable "O" to FIG. 4, through contact 1 of the SMCT0, over conductor 41 and through the winding of the AS0 select magnet to ground operating auxiliary switch select magnet AS0 thereby preparing the line link extension for interconnection with junctor 010.

When relay CH0(67) operates it also extends battery from conductor 6747 in FIG. 11, through its contact 1 in parallel with the winding of relay JCK0(82), over the circuit previously traced for operating the JCK0(82) relay, to the winding of the TJS0(53). This increases the current flow through select magnet TJS0(53) and causes that select magnet to operate preparing the trunk link 00-right for interconnection with the junctor 010.

The operation of the CHA(109) relay in FIG. 16 starts a hold magnet timing circuit (not shown) to allow time for the operation of all select magnets before any hold magnets are operated. Subsequent to the operation of the hold magnet timing circuit (not shown), a ground for operating the hold magnets is connected to the sleeve conductor of the channel by relays in the marker of the Busch patent which are represented in this disclosure by switch S1 of FIG. 15. This circuit can be traced from ground in the marker on conductor 10705, through contacts of switch S1, through contact 11 of the CH0(67) relay to conductor 8607 and over the trunk link test circuit to FIG. 14, as previously traced, to sleeve conductor 145, of trunk link 00-right and to the windings of hold magnets TH10 and TJH10. These hold magnets operate, and magnet TH10 closes cross points TSB0 and TS92 in the trunk switch for connecting the incoming trunk to trunk link 00-right, while magnet TJH10 closes crosspoints TJ00 on the trunk junctor switch connecting trunk link 00-right to junctor 010.

With crosspoints TJ00 of the trunk frame junctor switch operated the same ground from switch S1 is extended over the junctor sleeve conductor 105 of junctor 010 through cable "B" to FIG. 6, thence through junctor extension cable "B" to FIG. 4 and to the winding of hold magnet ASH0 operating that hold magnet and closing crosspoints AS00 to interconnect the tip, ring and sleeve conductors 108, 107 and 105 of the extension of junctor 010 with the tip, ring and sleeve conductors 82, 81 and 80 of the extension of line link 0.

The tip, ring and sleeve conductors have now been extended from the appearance of the incoming trunk on the trunk switch, to the line switch on which the called line appears.

Line junctor hold magnet LJH10 in FIG. 6 of line link frame 01 operates over the previously traced operating circuit for auxiliary hold magnet ASH0, but no crosspoints are closed at line link frame 01 since there were no select magnets operated on this switch.

As in the Busch Patent 2,585,904, the marker now checks that all of the above crosspoints are closed on line link frame 00, auxiliary switch frame 0, and trunk link frame 00 and proceeds to test for false crosses and grounds on the tip and ring conductors of the selected channel. If there is no false ground potential on the ring conductor, no false battery potential on the tip conductor or no false cross between the ring and tip conductors, a successful false cross and ground test will have been made, and the marker will operate to close a circuit for operating the line hold magnet. In the Busch patent these operations were performed by relays, but for this disclosure these relays will be represented by switch S2 in FIG. 15, and it is assumed that switch S2 is operated so that its contact 1 is closed indicating a successful false cross and ground test. A circuit can now be traced from ground in FIG. 15 of the marker, over conductor 9008, through the winding of relay LXP(109), over conductor 10924, through marker equipment (not shown), through contact 1 of switch S2, over conductor 10709, through marker equipment (not shown), over conductor 4708, through contact 9 of relay VFT0(31), thence over conductor 3120 in cable "R" to FIG. 12, through contact 7 of relay MCB1(2), over conductor 215 in cable "P" to FIG. 8, through contact 6 of line group relay LG0(6), over conductor 650 and through the winding of the line hold magnet LH00(5) to battery, operating the LXP(109) relay and the LH00(5) hold magnet in series. The operation of hold magnet LH00(5) closes crosspoints L00(5) extending the tip and ring conductors of the selected channel to called subscriber 100. Magnet LH00(5) also connects its winding to the sleeve conductor 510 of the line link 0, and at its auxiliary contacts 1 and 2, opens the circuit for subscriber line relay L00(5).

The marker now proceeds to make continuity and ground tests to check that all of the crosspoints of the selected channel are closed and that a continuous pair of tip and ring conductors have been extended from the incoming trunk to the called subscriber. These various marker tests will not be described here since they are not pertinent to an understanding of the instant invention and are described in considerable detail in the aforementioned Busch patent.

After the above tests have been made, a double connection test is made by disconnecting the original ground which operated the selected channel hold magnets, and connecting a supplementary ground to the sleeve of the channel through the winding of the double connection test relay, DCT(109). This is accomplished by relay circuitry in Busch; however, for the purpose of this description, it will be sufficient to operate switch S2 of FIG. 15 to its alternate position closing contact 2 and also to release switch 1 opening its contact 1 and thereby disconnecting the original operating ground for the trunk, trunk junctor and auxiliary switch hold magnets and releasing the LXP(109) relay. With these switches thus operated, the double connection test relay DCT(109) is placed in series with the windings of the hold magnets. If no double connection exists, relay DCT(109) operates in series with battery through the hold magnet windings.

With relay DCT(109) operated, a circuit is closed for operating the DCT1(92) relay in FIG. 19. This circuit can be traced from battery through the winding of the DCT1(92) relay, over conductor 9216, through marker equipment (not shown), over conductor 10930, through contact 1 of relay DCT(109), over conductor 9308, through contact 9 of relay CKG4(93), over conductor 9015 and through marker equipment (not shown) to ground.

The DCT1(92) relay in operating, opens at its contact 1, the operating circuit for the F(162) relay in the incoming trunk circuit releasing the F(162) relay. The F(162) relay, in releasing, releases the FB2(70) which in turn opens the operating circuit for the LV9(69) which releases. With the FB2(70) released, the tip conductor 5430 of the B appearance of level 9 in switch 0 is extended over contact 5 of relay FB2(70) to the tip conductor 16210 of the trunk, the ring conductor 5431 is extended over contact 9 of relay FB2(70) to the ring conductor 16211 of the trunk and a sleeve conductor 5432 is extended over contact 10 of relay FB2(70) to the sleeve conductor 16212 of the trunk.

The incoming trunk circuit can now take over control of the connection to the called line since the sleeve conductor 16212 extends over contact 5 of relay D(162) to ground, and the D(162) relay is locked under control of the A(162) relay which in turn is held operated by the distant office.

The FB2(70), in releasing, releases trunk select magnet TS90(54), the B appearance select magnet B(54) and the FBK(109) relay in the marker. The FB2(70) in releasing opens at its contact 4 the operating circuit for the LC0(54) on the trunk link frame. The LC0(54) relay releases and in turn releases the LCK(76) relay in the marker.

When the FB2(70) relay released extending the tip, ring and sleeve conductors from the selected channel through to the incoming trunk, the incoming trunk was actuated to connect central office ringing current over the channel to called subscriber 100. When the called subscriber 100 answers by lifting his receiver thereby closing a loop and tripping the ringing signal, the tip and ring conductors in the trunk are extended to the windings of the S(162) relay. Relay S(162) operates over the called subscriber loop, and at its contact 1, connects ground to sleeve conductor 16212 supplementing the holding ground on that conductor. The outgoing and incoming conductors of the trunk are connected through condensers T(162) and R(162) to supply a talking circuit between the distant office and the called subscriber.

*Marker release*

When relay FB2(70) releases as above described, ground from the sleeve of the incoming trunk is extended back over the sleeve of selected channel to the winding of the DCT(109) relay, shunting the DCT(109) relay. With relay DCT(109) released, a circuit is closed from previously traced ground on conductor 9308, through contact 2 of relay DCT(109), through marker equipment (not shown), over conductor 10932, through contact 2 of relay DCT1(92) and through the winding of the LK1(92) to battery. Relay LK1(92) operates in this circuit and locks through its contact 7, over conductor 9215, through contact 3 of relay CKG4(97) to ground. The operation of the LK1(92) relay is an indication that the connecting path between the incoming trunk and the called line has been set up, tested and found in satisfactory condition for service.

When relay LK1(92) operates it opens, at its contact 11, the operating circuit for relay FLG(115) releasing the latter relay. The release of relay FLG(115) opens the operating circuit for relay LL1(178) which also releases. It will be remembered that relay LL1(178) provided locking circuits for the line link frame location registration relays, FTT0(48), FTB0(58), FUT0(49), HGT0(29), VGT0(26) and VFT0(31), and when relay LL1(178) releases, all of these registration relays release.

When relay LK1(92) operated a circuit was closed for operating marker disconnect relays DIS1(114) and DIS2(114). This circuit can be traced from battery through the windings of relays DIS2(114) and DIS1(114), over conductor 11410 through marker equipment (not shown), over conductor 9310 and through contact 8 of the LK1(92) relay to ground. The DIS1(114) and the DIS2(114) relays operated and lock to a ground through contact 2 of the MA(143) relay in FIG. 18 of the incoming register marker connector over conductor 191 to FIG. 19 and through contacts 4 and 7 of the DIS1(114) relay.

The operation of the DIS1(114) and DIS2(114) relays causes the release of several relays in the marker to begin the release of all of the equipment, except the selected channel between subscriber 100 and the incoming trunk. The operating circuits for the equipment to be released may be opened at several points almost simultaneously; however, for the purpose of this description each circuit will be opened at only one point and it will be understood that some circuits may be opened in several points and at different times due to the release characteristics of the equipments which open these circuits.

At its contact 11 the DIS1(114) opens the operating circuit for the line link control relays LLC1(96) and LLC2(96) and the ONW(111) relay releasing these relays. At contact 5 of the DIS2(114) relay and at contact 3 of the DIS1(114) relay the operating circuit for the connector check ground CKG1(113), CKG2(97), and CKG3(97) relays is opened releasing these relays. At contact 8 the DIS1(114) relay opens the operating circuit for the trunk link control relays, TLC1(113) and TLC2(113), releasing these relays.

Relay CKG3(97) opens the operating circuit for relay CKG4(93) releasing the CKG4(93) relay. The CKG4(93) at its contact 3 opens a locking circuit for the LK1(92) releasing that relay and at its contact 9 opens the operating circuit for the DCT1(92) relay thereby releasing the DCT1(92) relay.

The release of the LLC1(96) and the LLC2(96) relays open several previously traced operating circuits thereby releasing line link frames 00 and 01. At contact 6 of the LLC1(96) relay, battery is removed from the start leads for line link frame 00 and line link frame 01 releasing the respective marker preference relays MP1(9) and MP12. The MPI(9) and the MP12 open the operating circuits for the LFK1–E and the LFK1–O in the marker releasing these relays. At its contact 2 marker preference relay MPI(9) opens the operating circuit for multicontact relay MCA11(6) releasing that relay. At contacts 8 and 9 the LLC1(96) opens the operating circuits for the MCA21(6) and MCB1(2) multicontact relays releasing the MCA21(6) and the MCB1(2) relays.

With the line link frame multicontact connector relays MCA11(6), MCA21(6) and MCB1(2) released, the marker is disconnected from the line link frames and the previously traced operating circuits for: the HG0(5), VGB(2) and LG0(6) relays and the LS0(5) and LJS0(5) select magnets on the line link frame 00; the previously traced operating circuits for the HGK(76), LFK(111), PRLL, and any of the TLL- relays that may be operated in the marker; and the previously traced operating circuits for the SMCT0 relay and the AS0 select magnet on the auxiliary switch frame are opened releasing all of these relays and select magnets.

Relay LLC1(96) at its contact 4 opens the locking circuit for channel relay CH0(67) and the CHA(109) channel auxiliary relay releasing these relays. At contact 1 relay CH0 opens the operating circuit for releasing the trunk junctor select magnet TJS0(53).

The release of any one of the check relays, such as the HGK(76) or the LFK(11), opens the operating circuit for the TK(92) relay which releases. The TK(92) releasing opens the operating circuit for the channel timing relay CHT(68) which also releases.

When the ONW(111) relay releases, it opens a locking circuit, at its contact 2, for the STP(79), the STP2(79) and the STP2B relays releasing these relays. The STP2B in releasing opens its contact 3 to release the STPLL1 associated with line link connectors 00 and 01.

The release of the TLC1(113) and the TLC2(113) relays open several previously traced operating circuits for disconnecting the trunk link frame from the marker.

At its contact 5, relay TLC1(113) removes battery from the start lead to trunk link frame 00 and releases the marker preference relay MP1(140). Relay MP1(140) in releasing opens the operating circuit for relay TFK3(117) releasing that relay. At contact 4, relay MP1(140) opens the operating circuit for connector relay MC(85) which releases, and at its contacts 2 and 3 relay MC(85) opens the operating circuits for multicontact relays MCC(102) and MCB(86) releasing these multicontact relays. With all of the trunk link connector multicontact relays MC(85), MCC(102), MCB(86) released the previously traced operating circuits for the R(54), G1(119) and the JC0(53) relays on the trunk link frame 00, and the RK(76), STF(75), 10TLF(79), JCK0(82), JCK1(82), TJ- and the TTL- relays in the marker, are opened, and all of these relays release.

Relay 10TLF(79), at its contact 1, opens the operating circuit for relay JG1(75); at its contact 4, opens the operating circuit for the 20F(74) relay; and at its contact 5, opens the operating circuit for the PNR(65) relay thereby releasing the PNR(65), the 20F(74) and the JG1(75) relays.

The PNR(65) in releasing opens the operating circuits for the TCH0(81) to TCH9(81) relays which release and in turn release the TCHK(76) relay.

When the DIS1(114) and the DIS2(114) relays operated a circuit was closed from ground, through contact 2 of each of these relays, over conductor 11416, through contact 11 of the MD(164) relay, through contact 7 of the RD(164) relay, over conductor 180, and through the winding of the MRL(23) relay of the incoming register to battery. The MRL(23) relay operates in this circuit and releases the incoming register marker connector and the incoming register.

At its contact 2, relay MRL(23) opens a locking circuit for the ON(23) relay thereby releasing it. Relay ON(23), in releasing, opens at its contact 10, the locking circuit for the relay SO(12), opens at its contact 6, the locking circuit for relay ON1(23) and, at its contact 9, the locking circuit for relay FG0(23) thereby releasing the SO(12), the ON1(23) and the FG0(23) relays. Relays ON1(23) in releasing, opens at its contact 12, the operating circuit for the RLK(15) relay.

Relay ON(23) or ON1(23) opens the locking circuits (not shown) for A0, A7, B1, B7, C4, C7, D4 and D7 registration relays in the incoming register digit registration circuit releasing these relays.

In addition, relay ON(23) opens a circuit (not shown) which is holding crosspoints 00(7) closed on the incoming register link. When crosspoints 00(7) are opened, the operating circuit for the TC1(23) is interrupted, releasing the TC1(23) which in turn releases the TC2(23) relay. The opening of crosspoints 00(7) also disconnects the pulsing relay L(16) from the trunk conductors releasing that relay.

When relay MRL(23) operated, the start lead for the incoming register marker connector was opened at contact 3 of the MRL(23) relay. This caused the release of the RS3(88) and the MS13(24) preference relays. At contact 2 of the RS3(88) relay, the operating circuit for relays RA(143) and RC(164) is opened, releasing these relays, and at contact 6, relay RS3(88) opens a similar operating circuit for relays RB(143) and RD(164) thereby releasing these relays.

Relay MS13(24), in releasing, opens its contacts 5 and 3 which release the multicontact connector relays MA(143) and MC(164). Relay MA(143) releases connector relay MB(143) and relay MC(164) releases connector relay MD(164). With the connector relays MA(143), MB(143), MC(164) and MD(164) released the marker is disconnected from the incoming register, and the MRL(23) relay in the register releases.

With the multicontact relays of the incoming register marker connector released, several relays in the marker can now release.

At contact 26 of relay MA(143), the operating circuit for incoming relay INC(153) is opened, releasing that relay, and at contact 30 of the MC(164) relay, the operating circuit for terminating relays TER1(128), TER2(93) and TER3(115) is opened releasing those relays.

At contacts 9, 10 and 4 of the MC(164) relay, the operating circuits for trunk link frame location relays TF4(152), TF7(152) and FGO(151) are opened releasing these three relays. Furthermore, the called number registration relays TH0(124), TH7(124), HN1(145), HN7(145), T4(145), T7(145), U4(146) and U7(146) release when the MA(143) and the MB(143) relays release.

It will be recalled that the marker disconnect relays, DIS1(114) and DIS2(114), were locked to contact 2 of the MA(143) relays in the incoming register marker connector. When the MA(143) relay releases, the locking circuit for the DIS1(114) and the DIS2(114) relays is interrupted thereby releasing the DIS1(114) and DIS2(114) relays and restoring the marker to normal.

*Release of the selected channel*

It will be remembered that when the called subscriber 100 answered, in response to a central office ringing signal from the incoming trunk, a loop was closed over the tip and ring of the channel to operate relay S(162) in the trunk and a ground was extended back over the sleeve of the selected channel to maintain the hold magnets on the various crossbar switches operated. It will also be recalled that the incoming and outgoing tip and ring conductors of the trunk were connected through condensers T(162) and R(162) to supply a talking path between called subscriber 100 and the calling subscriber in the distant office. When the parties have finished conversing and restore their receivers to normal, both the A(162) and the S(162) relays release. The A(162) relay, in releasing, opens the locking circuit for the D(162) relay in the trunk which releases. The D(162) relay, in releasing, opens the locking circuit for relay C0(162), which also releases.

With the D(162) and the S(162) relays released, the holding ground is removed from the sleeve of the selected channel thereby releasing: (1) hold magnets TH10 and TJH10 and opening crosspoints TSB00 and TJ00 on the trunk link frame trunk switch and trunk-junctor switch respectively; (2) hold magnet ASH0 thereby opening crosspoints AS00 on auxiliary switch frame 0; (3) and hold magnets and LH00(5) thereby opening crosspoints L00(5) on the line switch of line link frame 00. The LJH10 hold magnet on the line-junctor switch of line link frame 01 also releases; however, it will be recalled that no crosspoints were closed at this switch.

It will now be readily seen from the foregoing description that there is provided a novel arrangement for improving the selection and utilization of channels in a switching system.

It will be understood that the above-described arrangements are merely illustrative of the application and principles of the invention. Numerous other arrangements may be devised by those skilled in the art without departing from the spirit and scope of the invention.

What is claimed is:

1. In a switching office wherein pairs of mutually disconnected terminals at said office may be interconnected only over a channel serially connected therebetween,
  a plurality of channels divided into subgroups where a pair of terminals to be connected at said office is normally interconnectable only over a channel of a corresponding subgroup,
  testing means selectively connectable to any said subgroup for ascertaining channel availability in a subgroup connected thereto,
  means for designating any said pair of terminals for interconnection with each other over a channel and for causing said testing means to be connected to a first subgroup corresponding to said one designated pair,
and circuit means
  (*a*) controlled by said testing means incident to unavailability of a channel in said first subgroup for causing said testing means to be connected to a second subgroup corresponding to a pair other than said one designated pair
  (*b*) and controlled by said testing means incident to availability of a channel in said second subgroup for making said second subgroup available to interconnect at said office said one designated pair while maintaining said one designated pair disconnected from said other pair.

2. The invention defined in claim 1
wherein said channel subgroups are normally disconnected from each other
and wherein said circuit means makes said second subgroup available by interconnecting said first and second subgroups.

3. The invention defined in claim 2
wherein a said first subgroup comprises a first plurality of trunk links, a plurality of line links, and a first plurality of junctors;
wherein said second subgroup comprises a second plurality of trunk links and a second plurality of junctors;
and wherein said means for interconnecting said first and second subgroups comprises intermediate links for interconnecting said second plurality of junctors with said plurality of line links.

4. In a switching office wherein pairs of mutually disconnected terminals at said office may be interconnected only over a channel serially connected therebetween,
  a plurality of channels divided into subgroups where a pair of terminals to be connected at said office is normally interconnectable only over a channel of a corresponding subgroup, each said channel comprising a plurality of links;
testing means selectively connectable to respective links of any said channel subgroup for ascertaining link availability in a subgroup connected thereto;
means for designating any said pair of terminals for interconnection with each other over a channel;
first selecting means controlled by said designating means for selecting a first subgroup corresponding to said one designated pair and for causing said testing means to be connected to respective links of said first subgroup;
and circuit means comprising
  (*a*) first checking means operated and released under joint control of said designating and said selecting means, said first checking means being operated when said one pair is designated and when said testing means is connected to the links of said first subgroup and being released when said testing means is disconnected from said first subgroup
  (*b*) first detecting means controlled by said operated first checking means and by said testing means upon unavailability of at least one link in each said channel of said first subgroup for disconnecting said testing means from said same links and for releasing said checking means,
  (*c*) second selecting means controlled incident to the release of said first checking means for selecting channl links of a subgroup normally corresponding to a pair other than said designated pair and to cause said testing means to be connected to said other selected links,
  (*d*) second checking means effective when said other links are selected to cause first checking means to reoperate (e) and second detecting means controlled by the reoperation of said first checking means and incident to said testing means ascertaining all links available in at least one channel of said other selected subgroup for interconnecting at said office links of said designated subgroup and said other channel subgroup while maintaining said other pair and said designated pair disconnected.

5. The invention defined in claim 4 wherein each channel of a subgroup comprises an associated first stage link, second stage link, and third stage link;

wherein said testing means comprises a plurality of testing devices connectable to each said link of each said channel, each said device being rendered effective when a said link connected thereto is unavailable and rendered ineffective when a said link connected thereto is available; and wherein said circuit means also comprises an auxiliary switching stage available to certain of said second and third stage links.

6. In a switching office, a plurality of trunk groups each comprising primary trunk group switches having trunks terminated thereon, secondary trunk group switches, and trunk links interconnecting said primary and secondary trunk group switches;

a plurality of line groups each comprising primary line group switches having lines terminated thereon, secondary line group switches, and line links interconnecting said primary and secondary line group switches;

a plurality of channels for interconnecting at said office any said trunk with any said line, (a) said channels comprising channel components including junctors interconnecting said trunk group secondary switches with said line group secondary switches and including said trunk links and including said line links, (b) said channels being divided into subgroups where a particular line and a particular trunk are normally interconnectable only by a channel of a subgroup corresponding to said particular line;

channel test circuitry selectively connectable to any said subgroup for testing channel availability in a subgroup connected thereto;

means for selecting a first subgroup corresponding to a particular said line and for connecting said test circuitry to said first subgroup;

means controlled by said test circuitry incident to unavailability of a channel in said first subgroup for causing said selecting means to select a second subgroup corresponding to a different line and for connecting said test circuitry to said second subgroup;

and means controlled by said test circuitry incident to availability of a channel in said second subgroup for interconnecting at said office said particular trunk with said particular line using certain channel components of said first and said second subgroups.

7. The invention defined in claim 6 wherein intersubgroup links are provided and wherein said certain channel components include an available trunk link and an available junctor from said second subgroup, an available line link from said first subgroup, and an intersubgroup link.

8. The invention defined in claim 7 wherein said intersubgroup links comprise extensions of said first subgroup line links, extensions of said second subgroup junctors, and wherein said subgroup interconnecting means comprises operable switch means for interconnecting said link extensions with said junctor extensions, 9. The invention defined in claim 8 wherein lockout means is provided, said lockout means being controlled incident to the availability of a channel in said second subgroup for preventing the interconnection of a said available second subgroup junctor with a line link other than a said available first subgroup line link and wherein said switch means comprises means operated under joint control of said test circuitry and said lockout means for interconnecting a first subgroup link extension with a second subgroup junctor extension.

10. In a switching office, a trunk link frame comprising a trunk switch having trunks terminated thereon, a plurality of trunk-junctor switches, and trunk links interposed between said trunk switches and said trunk-junctor switches;

a plurality of line link frames each comprising line switches having lines terminated thereon, line-junctor switches, and line links interposed between said line switches and said line-junctor swtiches;

a plurality of subgroups of channels for interconnecting at said office any said trunk with any said line, (a) each channel in a subgroup comprising components including a said line link, a said trunk link, and a junctor interposed between a said trunk-junctor switch and a said line-junctor switch;

a first channel subgroup for interconnecting a particular trunk with any line on only a first line link frame;

a second channel subgroup arranged for interconnecting said particular trunk with any line on a line link frame other than said first line link frame;

channel test circuitry selectively connectable to any said subgroup for ascertaining availability of components thereof;

means for designating said particular trunk and a first frame line for interconnection over a channel;

first selecting means controlled by said designating means incident to said designation of said particular trunk and said designated line for selecting said first channel subgroup and for connecting said channel test circuitry thereto;

an intersubgroup switching stage at said office interposed between said first line link frame line links and said other line link frame junctors;

circuit means comprising (a) an all channel busy detecting means operated by said test circuitry incident to unavailability of a channel in said first subgroup, (b) releasing means controlled by said operated detecting means for disconnecting said channel test circuitry from said first subgroup, (c) second selecting means controllable for selecting said second subgroup and for assuming control of said other line link frame, (d) checking means effective incident to said disconnection for controlling said second selecting means to select said second subgroup and to connect said channel test circuitry thereto, and (e) means effective when said other line link frame is under control of said second selecting means for controlling said intersubgroup switching stage;

and means controlled by said test circuitry incident to availability of a channel in said second subgroup for establishing at said office an interconnection between said particular trunk and said designated line over a channel including an available second subgroup trunk link and junctor, an available first subgroup line link, and said intersubgroup switching stage.

11. The invention defined in claim 10
wherein each line link frame comprises a line link frame connecting circuit including means for connecting said test circuit to said links and means for indicating when said second subgroup can be made available and a control circuit for actuating said connecting circuit; and
wherein said second selecting means
(a) comprises means for interconnecting the control circuits of said first and said other line link frames,
(b) means for blocking said other frame connecting circuit from actuation by said other control circuit, and
(c) second indicating means operated incident to the interconnection of both of said line link frame control circuits and the blocking of said other frame connecting circuit.

12. The invention defined in claim 11
wherein each said line link frame control circuit comprises a preference relay operated over a corresponding control path for actuating said connecting circuit; and
wherein said interconnecting means comprises a bridging relay having contacts for interconnecting said first and said other line link frame control paths.

13. The invention defined in claim 12
wherein said blocking means comprises a lockout relay having contacts effective when operated for blocking the actuation of only said other line link frame connecting circuit.

14. The invention defined in claim 13
wherein said intersubgroup switching stage comprises a plurality of crossbar switches; each said switch comprising
(a) horizontals having said first subgroup line links connected thereto,
(b) verticals having said second subgroup junctors connected thereto,
(c) horizontal select magnets each having a normally open control path, and
(d) vertical hold magnets,
wherein any horizontal can be connected to any vertical of a said switch by selectively controlling the respective magnets to close crosspoints at the intersection of the corresponding horizontal and vertical; and
wherein said means for controlling said intersubgroup switching stage comprises means controlled by said lockout relay and said second indicating means for closing a said normally open path corresponding to said available first subgroup line link.

15. In a switching office employing crossbar switches
a mated pair of line link frames at said office including first and second line link frames each having a corresponding plurality of line-junctor switches, a plurality of line switches and a plurality of line links interconnecting the horizontals of the line and line-junctor switches of a said frame;
a plurality of junctor subgroups serving each line link frame of said mated pair wherein each junctor of a subgroup is connected to a different line-junctor switch vertical; and
an auxiliary switching stage at said office interposed between the line links of one frame and the junctors of the other frame of said mated pair, said auxiliary stage comprising a plurality of pairs of auxiliary crossbar switches, each said auxiliary switch pair being associated with corresponding line-junctor switches of said mated frames, said auxiliary switch pair arranged so that the line links connected to a said first frame line-junctor switch and the junctors connected to the corresponding second frame line-junctor switch are connected to the first one of said auxiliary switch pair and so that the line links connected to a said second frame line-junctor switch and the junctors connected to corresponding first frame line-junctor switch are connected to the other of said auxiliary switch pair.

16. A switching office comprising a switching network, a trunk group terminated at said network, first and second line groups terminated at said network, means for normally extending said first line group to said trunk group over a first plurality of channels, means for normally extending said second line group to said trunk group over a second plurality of channels, and control means responsive to the unavailability of a channel in said first plurality of channels for extending one of said first group lines over a portion of a selected channel in said first plurality of channels and a portion of a selected channel in said second plurality of channels to said trunk group.

17. The invention defined in claim 16 wherein said control means comprises switching means for coupling selected portions of said first plurality of channels with selected portions of said second plurality of channels and means for blocking the coupling of other portions of said channels to said selected portions.

18. A telephone office comprising a trunk link frame having trunks terminated thereon, first and second line link frames each having different lines terminated thereon, a first group of channels each comprising a plurality of links for extending said first frame lines to said trunks, a second group of channels each comprising a plurality of links for extending said second frame lines to said trunks, switch means at said office for selectively coupling idle links of said first channel group with idle links of said second channel group, and control means effective when at least one link is busy for each channel of said first channel group for actuating said switch means to extend a first frame line to one of said trunks over selected idle links in said first and second channel groups.

References Cited by the Examiner

UNITED STATES PATENTS

| | | | |
|---|---|---|---|
| 2,938,960 | 5/60 | Harris | 179—18 |
| 3,017,465 | 1/62 | Gibson | 179—22 |
| 3,041,409 | 6/62 | Zarouni | 179—22 |
| 3,098,125 | 7/63 | Berch | 179—18 |

ROBERT H. ROSE, *Primary Examiner.*

WALTER L. LYNDE, *Examiner.*